US012165576B2

(12) United States Patent
Lee et al.

(10) Patent No.: US 12,165,576 B2
(45) Date of Patent: Dec. 10, 2024

(54) PIXEL, DISPLAY DEVICE HAVING SAME AND DRIVING METHOD THEREOF

(71) Applicant: SAMSUNG DISPLAY CO., LTD., Yongin-si (KR)

(72) Inventors: Yo Han Lee, Yongin-si (KR); Su Mi Moon, Yongin-si (KR); Hyun Min Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/482,191

(22) Filed: Oct. 6, 2023

(65) Prior Publication Data

US 2024/0038152 A1 Feb. 1, 2024

Related U.S. Application Data

(63) Continuation of application No. 17/977,580, filed on Oct. 31, 2022, now Pat. No. 11,783,764, which is a (Continued)

(30) Foreign Application Priority Data

Oct. 8, 2018 (KR) ........................ 10-2018-0119972

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2300/0426* (2013.01); (Continued)

(58) Field of Classification Search
CPC ................... G09G 3/32; G09G 3/2007; G09G 2300/0426; G09G 2300/0439; (Continued)

(56) References Cited

U.S. PATENT DOCUMENTS 7,592,981 B2 9/2009 Maeda
7,675,494 B2 3/2010 Hong et al.
(Continued)

FOREIGN PATENT DOCUMENTS

EP 3273435 1/2018
KR 10-0790606 1/2008
(Continued)

OTHER PUBLICATIONS

International Search Report, with English translation, corresponding to International Application No. PCT/KR2019/004163 dated Jul. 16, 2019.
(Continued)

*Primary Examiner* — Andrew Sasinowski
(74) *Attorney, Agent, or Firm* — KILE PARK REED & HOUTTEMAN PLLC

(57) ABSTRACT

A pixel includes a first light source including at least one first light emitting element between a first split electrode and a second power supply; a second light source unit including at least one second light emitting element between a second split electrode and the second power supply; a driving-current generator including a first transistor between a first power supply and the first and second light source units and generating a driving current corresponding to a first data signal; a first switching unit including a first switching element between the driving-current generator and the first light source; and a second switching unit including a second switching element between the driving-current generator and the second light source unit and controlling an electrical connection between the first and second light source units in response to a second data signal.

17 Claims, 9 Drawing Sheets

Related U.S. Application Data continuation of application No. 17/283,771, filed as application No. PCT/KR2019/004163 on Apr. 8, 2019, now Pat. No. 11,488,520.

(52) U.S. Cl.
CPC ............... *G09G 2300/0439* (2013.01); *G09G 2300/0809* (2013.01); *G09G 2310/0243* (2013.01); *G09G 2310/027* (2013.01); *G09G 2310/0272* (2013.01); *G09G 2310/08* (2013.01); *G09G 2330/00* (2013.01)

(58) Field of Classification Search
CPC ... G09G 2300/0809; G09G 2310/0243; G09G 2310/027; G09G 2310/0272; G09G 2310/08; G09G 2330/00; G09G 2300/0465; G09G 2300/0804; G09G 2300/0819; G09G 2300/0852; G09G 2300/0861; G09G 2310/0251; G09G 2310/0262
See application file for complete search history.

(56) References Cited

U.S. PATENT DOCUMENTS

| | | | | |
|---|---|---|---|---|
| 9,293,083 | B2 | 3/2016 | Chen | |
| 9,355,593 | B2 | 5/2016 | Jeong et al. | |
| 9,691,348 | B2 | 6/2017 | Kim et al. | |
| 11,488,520 | B2 | 11/2022 | Lee et al. | |
| 11,783,764 | B2 * | 10/2023 | Lee | G09G 3/32 345/691 |
| 2009/0315874 | A1 | 12/2009 | Kim | |
| 2010/0265235 | A1 | 10/2010 | Lee | |
| 2013/0063499 | A1 | 3/2013 | Tanaka et al. | |
| 2013/0135324 | A1 | 5/2013 | Hong et al. | |
| 2014/0346475 | A1 | 11/2014 | Cho et al. | |
| 2014/0354704 | A1 | 12/2014 | Pak | |
| 2015/0123884 | A1 | 5/2015 | Kim | |
| 2017/0188469 | A1 | 6/2017 | Taguchi et al. | |
| 2018/0175106 | A1 | 6/2018 | Kim et al. | |

FOREIGN PATENT DOCUMENTS

| | | |
|---|---|---|
| KR | 10-0952814 | 4/2010 |
| KR | 10-1139527 | 5/2012 |
| KR | 10-1361983 | 2/2014 |
| KR | 10-2014-0140968 | 12/2014 |
| KR | 10-2015-0052666 | 5/2015 |
| KR | 10-2015-0144834 | 12/2015 |
| KR | 10-2016-0078618 | 7/2016 |
| KR | 10-2016-0101572 | 8/2016 |
| KR | 10-1875123 | 7/2018 |
| WO | 2015/032140 | 3/2015 |

OTHER PUBLICATIONS

Written Opinion, with English translation, corresponding to International Application No. PCT/KR2019/004163, dated Jul. 16, 2019.
Extended European Search Report for European Patent Application or Patent No. 19870645.9, dated May 27, 2022.

* cited by examiner

PIXEL, DISPLAY DEVICE HAVING SAME AND DRIVING METHOD THEREOF

CROSS-REFERENCE TO RELATED APPLICATION(S)

This is a continuation of U.S. patent application Ser. No. 17/977,580, filed Oct. 31, 2022 (now U.S. Pat. No. 11,783,764), the disclosure of which is herein incorporated by reference in its entirety. U.S. patent application Ser. No. 17/977,580 is a continuation of U.S. patent application Ser. No. 17/283,771, filed Apr. 8, 2021, now U.S. Pat. No. 11,488,520, issued Nov. 1, 2022, the disclosure of which is herein incorporated by reference in its entirety. U.S. patent application Ser. No. 17/283,771 is a national entry of International Application No. PCT/KR2019/004163, filed on Apr. 8, 2019, which claims under 35 U.S.C. § 119(a) and 365(b) priority to and benefits of Korean Patent Application No. 10-2018-0119972, filed on Oct. 8, 2018, in the Korean Intellectual Property Office, the entire contents of which are incorporated herein by reference.

BACKGROUND

1. Technical Field

Embodiments relate to a pixel, a display device including the pixel, and a driving method thereof.

2. Description of the Related Art

Recently, a technique of manufacturing a subminiature light emitting element using a material having a reliable inorganic crystal structure and manufacturing a display device using the light emitting element has been developed. For example, a technique of manufacturing subminiature light emitting elements having a small size corresponding to a range from a nano-scale size to a micro-scale size, and forming a light source of a pixel using the subminiature light emitting elements has been developed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments are directed to a pixel including a plurality of light emitting elements, a display device including the pixel, and a driving method thereof.

According to an aspect of the disclosure, a pixel may include a first light source unit including at least one first light emitting element electrically connected between a first split electrode and a second power supply; a second light source unit including at least one second light emitting element electrically connected between a second split electrode and the second power supply; a driving-current generator including a first transistor electrically connected between a first power supply and the first light source unit and the second light source unit, the driving-current generator generating a driving current corresponding to a first data signal applied to a first data line; a first switching unit including a first switching element electrically connected between the driving-current generator and the first light source unit; and a second switching unit including a second switching element electrically connected between the driving-current generator and the second light source unit, the second switching unit controlling an electrical connection between the first transistor and the second light source unit in response to a second data signal applied to a second data line.

The first transistor may include a first electrode electrically connected to the first power supply; a second electrode electrically connected to the first switching element and the second switching element; and a gate electrode electrically connected to a first node.

The driving-current generator may further include at least one of a second transistor electrically connected between the first data line and the first electrode of the first transistor, and including a gate electrode electrically connected to a scan line; a third transistor electrically connected between the second electrode of the first transistor and the first node, and including a gate electrode electrically connected to the scan line; a fourth transistor electrically connected between the first node and an initialization power supply, and including a gate electrode electrically connected an initialization control line; a fifth transistor electrically connected between the first power supply and the first electrode of the first transistor, and including a gate electrode electrically connected to an emission control line; and a first capacitor electrically connected between the first power supply and the first node.

The first switching unit may include a sixth transistor being the first switching element. The sixth transistor may be electrically connected between the first transistor and the first split electrode, and may include a gate electrode electrically connected to an emission control line.

The second switching unit may include a seventh transistor electrically connected between the first transistor and the second split electrode, the seventh transistor being the second switching element; an eighth transistor electrically connected between a gate electrode of the seventh transistor and a second node, and including a gate electrode electrically connected to an emission control line; a ninth transistor electrically connected between the second data line and the second node, and including a gate electrode electrically connected to a scan line; and a second capacitor electrically connected between the first power supply and the second node.

The first light source unit may include a pixel electrode spaced apart from the first split electrode; and a plurality of first light emitting elements including the at least one first light emitting element, and electrically connected in parallel between the first split electrode and the pixel electrode.

The second light source unit may include a pixel electrode spaced apart from the second split electrode; and a plurality of second light emitting elements including the at least one second light emitting element and electrically connected in parallel between the second split electrode and the pixel electrode.

The first split electrode and the second split electrode may be spaced apart from each other and disposed in an emission region. The first light source unit and the second light source unit may further include a pixel electrode electrically connected between an end of each of the at least one first light emitting element and the at least one second light emitting element and the second power supply.

According to an aspect of the disclosure, a display device may include a timing controller that outputs first data corresponding to image data, and second data corresponding to a gray-scale level of the image data; a data driver that generates first data signals and second data signals corresponding to the first data and the second data, respectively, and outputs the first data signals and the second data signals to a first data line and a second data line, respectively; and at least one pixel electrically connected to the first data line and the second data line. The at least one pixel may include a first light source unit including at least one first light emitting element electrically connected between a first split electrode and a second power supply; a second light source unit including at least one second light emitting element electrically connected between a second split electrode and the second power supply; a driving-current generator including a first transistor electrically connected between a first power supply and the first light source unit and the second light source unit, the driving-current generator generating a driving current corresponding to the first data signal; a first switching unit including a first switching element electrically connected between the driving-current generator and the first light source unit; and a second switching unit including a second switching element electrically connected between the driving-current generator and the second light source unit, the second switching unit controlling an electrical connection between the first transistor and the second light source unit in response to the second data signal.

The timing controller may include a gray-scale determiner that compares a gray-scale value corresponding to the at least one pixel among gray-scale values included in the image data with a reference gray-scale value and generates the second data corresponding to a compared result of the gray-scale value corresponding to the pixel and the reference gray-scale value.

The gray-scale determiner may output the second data having a first gray-scale value corresponding to a gate-on voltage when the gray-scale value corresponding to the at least one pixel is larger than the reference gray-scale value, and may output the second data having a second gray-scale value corresponding to a gate-off voltage when the gray-scale value corresponding to the at least one pixel is equal to or less than the reference gray-scale value.

The display device may include a pixel unit including a plurality of pixels disposed on horizontal lines and vertical lines; scan lines electrically connected to pixels of at least each horizontal line and first data lines and second data lines electrically connected to pixels of each vertical line. The data driver may include data channels electrically connected coupled to different data lines among the first data lines and the second data lines.

The first transistor may include a first electrode electrically connected to the first power supply; a second electrode electrically connected to the first switching element and second switching element; and a gate electrode electrically connected to a first node.

The driving-current generator may further include at least one of a second transistor electrically connected between the first data line and the first electrode of the first transistor, and including a gate electrode electrically connected to a scan line of a corresponding horizontal line; a third transistor electrically connected between the second electrode of the first transistor and the first node, and including a gate electrode electrically connected to the scan line; a fourth transistor electrically connected between the first node and an initialization power supply, and including a gate electrode electrically connected to an initialization control line of the corresponding horizontal line; a fifth transistor electrically connected between the first power supply and the first electrode of the first transistor, and including a gate electrode electrically connected to an emission control line of the corresponding horizontal line; and a first capacitor electrically connected between the first power supply and the first node.

The first switching unit may include a sixth transistor being the first switching element, and the sixth transistor may be electrically connected between the first transistor and the first split electrode, and may include a gate electrode electrically connected to an emission control line of a corresponding horizontal line.

The second switching unit may include a seventh transistor electrically connected between the first transistor and the second split electrode, the seventh transistor being the second switching element; an eighth transistor electrically connected between a gate electrode of the seventh transistor and a second node, and including a gate electrode electrically connected to an emission control line of a corresponding horizontal line; a ninth transistor electrically connected between the second data line and the second node, and including a gate electrode electrically connected to a scan line of the corresponding horizontal line; and a second capacitor electrically connected between the first power supply and the second node.

The first split electrode and the second split electrode may be spaced apart from each other and disposed in an emission region of the at least one pixel, and the first light source unit and the second light source unit may further include a pixel electrode electrically connected between an end of each of the at least one first light emitting element and the second light emitting element and the second power supply.

According to an aspect of the disclosure, a method of driving a display device may include generating first data corresponding to image data; comparing the image data with a reference gray-scale value, and generating second data corresponding to a compared result of the image data and the reference gray-scale value; generating first data signals and second data signals corresponding to the first data and the second data, respectively, and supplying the first data signals and second data signals to a pixel; generating a driving current corresponding to the first data signal; and driving a light source unit of the pixel by the driving current. Light emitting elements forming the light source unit of the pixel may be selectively driven in response to the second data signal.

Generating the second data may include outputting the second data having a first gray-scale value corresponding to a gate-on voltage when a gray-scale value of the image data corresponding to the pixel is larger than the reference gray-scale value, and outputting the second data having a second gray-scale value corresponding to a gate-off voltage when a gray-scale value of the image data corresponding to the pixel is equal to or less than the reference gray-scale value.

When the gray-scale value of the image data corresponding to the pixel is equal to or less than the reference gray-scale value, an electrical connection between a number of the light emitting elements and a drive transistor of the pixel may be interrupted.

According to an embodiment, a pixel, a display device including the pixel, and a driving method thereof may selectively drive at least some or a predetermined number of a plurality of light emitting elements provided or disposed in each pixel. According to an embodiment, a gray scale may be more precisely expressed even in a low gray-scale region.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE EMBODIMENTS

Figure 1A:
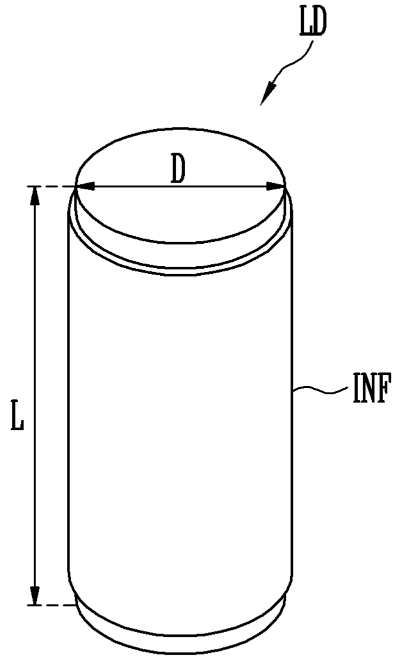
FIGS. 1A and 1B illustrate a light emitting element in accordance with an embodiment.

Reference will now be made in detail to various embodiments, examples of which are illustrated in the accompanying drawings and described below. Embodiments may be variously modified in many different forms. However, the disclosure is not limited to the following embodiments and may be modified into various forms.

Some elements which may not be directly related to the features of the disclosure may be omitted in the drawings to clearly explain the disclosure. Furthermore, the sizes, ratios, etc. of some elements in the drawings may be slightly exaggerated. It should be noted that the same reference numerals are used to designate the same or similar elements throughout the drawings, and repetitive explanation may thus be omitted.

It will be understood that, although the terms "first", "second", etc. may be used herein to describe various elements, these elements should not be limited by these terms. It will be further understood that the terms "comprise", "include", "have", and their variations thereof when used in this specification, specify the presence of stated features, integers, steps, operations, elements, components, and/or combinations of them but do not preclude the presence or addition of one or more other features, integers, steps, operations, elements, components, and/or combinations thereof. Furthermore, when a first component or part is disposed on a second component or part, the first component or part may be not only directly on the second component or part but a third component or part or components or parts may intervene between them. Furthermore, when a first component or part is coupled or connected to a second component or part, the first component or part may be not only directly coupled or connected to the second component or part but a third component or part or components or parts may intervene between them.

Embodiments and details of the disclosure are described with reference to the accompanying drawings in order to describe the disclosure in detail so that those having ordinary skill in the art to which the disclosure pertains can practice the disclosure. Furthermore, a singular form may include a plural form unless specifically mentioned in a sentence.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B.

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the scope of the disclosure. The singular forms include the plural forms unless the context clearly indicates otherwise.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

As used herein, the term "unit" denotes a structure or element as illustrated in the drawings and as described in the specification. However, the disclosure is not limited thereto. The term "unit" is not to be limited to that which is illustrated in the drawings.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIGS. 1A, 1B, 2A, 2B, 3A, and 3B each illustrate a light emitting element LD in accordance with an embodiment. In detail, FIGS. 1A, 1B, 2A, 2B, 3A, and 3B illustrate perspective views and sectional views of light emitting elements LD in accordance with other embodiments. Although FIGS. 1A to 3B illustrate that each light emitting element LD may be a substantially cylindrical rod-type light emitting diode, the kind and/or shape of the light emitting element LD in accordance with the disclosure is not limited thereto.

Figure 1B:
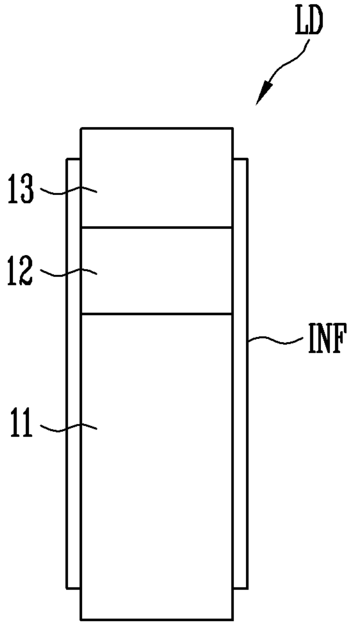

First, referring to FIGS. 1A and 1B, the light emitting element LD (for example, the light emitting diode) in accordance with an embodiment may include a first conductivity type semiconductor layer 11 (also referred to as a "first semiconductor layer"), a second conductivity type semiconductor layer 13 (also referred to as a "second semiconductor layer"), and an active layer 12 interposed between the first and second conductivity type semiconductor layers 11 and 13. For example, the light emitting element LD may be a stack formed by successively stacking the first conductivity type semiconductor layer 11, the active layer 12, and the second conductivity type semiconductor layer 13 in a longitudinal direction.

In an embodiment, the light emitting element LD may be provided in the form of a rod extending in one direction. If the direction in which the light emitting element LD extends is defined as the longitudinal direction, the light emitting element LD may have a first end and a second end with respect to the longitudinal direction.

In an embodiment, one of the first and second conductivity type semiconductor layers 11 and 13 may be disposed on the first end of the light emitting element LD, and the other of the first and second conductivity type semiconductor layers 11 and 13 may be disposed on the second end of the light emitting element LD.

In an embodiment, the light emitting element LD may be a rod-type light emitting diode manufactured in the form of a rod. In this specification, the term "rod-type" may include a rod-like shape and a bar-like shape such as a substantially cylindrical shape and a substantially prismatic shape extending in the longitudinal direction (for example, to have an aspect ratio greater than 1), and the cross-sectional shape thereof is not limited to a particular shape. For example, a length L of the light emitting element LD may be greater than a diameter D thereof (or a width of the cross-section thereof).

In an embodiment, the light emitting element LD may have a small size corresponding to a nano scale to a micro scale, for example, a diameter D and/or a length L corresponding to a nano scale to micro scale range. However, in the disclosure, the size of the light emitting element LD is not limited thereto. For example, the size of the light emitting element LD may be changed in various ways depending on design conditions of various devices, for example, a pixel, which employs, as a light source, a light emitting device using a light emitting element LD.

The first conductivity type semiconductor layer 11 may include, for example, at least one n-type semiconductor layer. For instance, the first conductivity type semiconductor layer 11 may include an n-type semiconductor layer which may include any one semiconductor material of InAlGaN, GaN, AlGaN, InGaN, AlN, and InN, and is doped with a first conductive dopant such as Si, Ge, or Sn. However, the material forming the first conductivity type semiconductor layer 11 is not limited to this, and the first conductivity type semiconductor layer 11 may be formed of various other materials.

The active layer 12 may be disposed on the first conductivity type semiconductor layer 11 and have a single or multiple quantum well structure. In an embodiment, a cladding layer (not shown) doped with a conductive dopant may be formed or disposed above and/or under or below the active layer 12. For example, the cladding layer may be formed of an AlGaN layer or an InAlGaN layer. In an embodiment, a material such as AlGaN or AlInGaN may be used to form the active layer 12, and various other materials may be used to form the active layer 12.

If an electric field of a predetermined voltage or more is applied to the opposite ends of the light emitting element LD, the light emitting element LD emits light by combination of electron-hole pairs in the active layer 12. Since light emission of the light emitting element LD may be controlled based on the foregoing principle, the light emitting element LD may be used as a light source of various light emitting devices as well as a pixel of the display device.

The second conductivity type semiconductor layer 13 may be disposed on the active layer 12 and include a semiconductor layer of a type different from that of the first conductivity type semiconductor layer 11. For example, the second conductivity type semiconductor layer 13 may include at least one p-type semiconductor layer. For instance, the second conductivity type semiconductor layer 13 may include a p-type semiconductor layer which may include any one semiconductor material of InAlGaN, GaN, AlGaN, InGaN, AlN, and InN, and is doped with a second conductive dopant such as Mg. However, the material forming the second conductivity type semiconductor layer 13 is not limited to this, and the second conductivity type semiconductor layer 13 may be formed of various other materials.

In an embodiment, the light emitting element LD may further include an insulating film INF provided or disposed on the surface of the light emitting element LD. The insulating film INF may be formed or disposed on the surface of the light emitting element LD to enclose an outer circumferential surface of at least the active layer 12. For example, the insulating film INF may further enclose a region of each of the first and second conductivity type semiconductor layers 11 and 13. The insulating film INF may allow the opposite ends of the light emitting element LD that have different polarities to be exposed to the outside. For example, the insulating film INF may expose one end of each of the first and second conductivity type semiconductor layers 11 and 13 that may be disposed on the respective opposite ends of the light emitting element LD with respect to the longitudinal direction, for example, may expose each of the top and bottom surfaces of the cylinder rather than covering or overlapping it.

In an embodiment, the insulating film INF may include at least one insulating material of $SiO_2$, $Si_3N_4$, $Al_2O_3$, and $TiO_2$, but it is not limited thereto. In other words, the material forming the insulating film INF is not limited to a particular material, and the insulating film INF may be formed of various insulating materials.

In an embodiment, the light emitting element LD may further include additional other components as well as the first conductivity type semiconductor layer 11, the active layer 12, the second conductivity type semiconductor layer 13, and/or the insulating film INF. For example, the light emitting element LD may further include at least one fluorescent layer, at least one active layer, at least one semiconductor layer and/or at least one electrode layer disposed on one end of the first conductivity type semiconductor layer 11, the active layer 12, and/or the second conductivity type semiconductor layer 13.

Figure 2A:
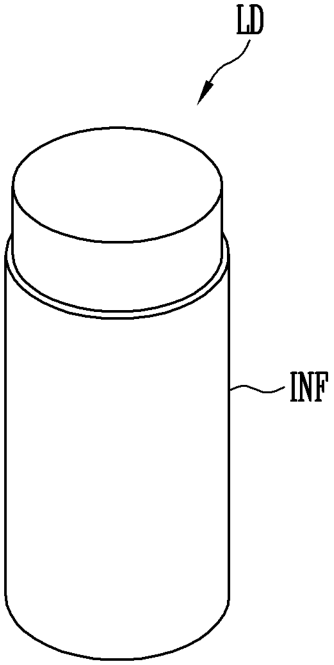
FIGS. 2A and 2B illustrate a light emitting element in accordance with an embodiment.
Figure 2B:
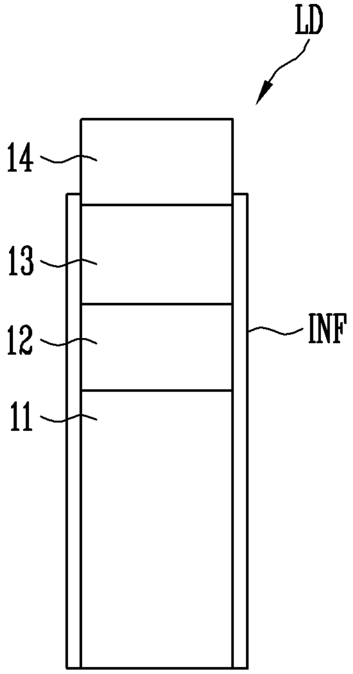
Figure 3A:
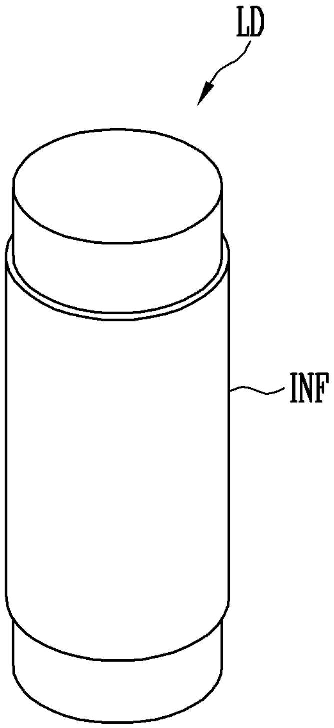
FIGS. 3A and 3B illustrate a light emitting element in accordance with an embodiment.
Figure 3B:
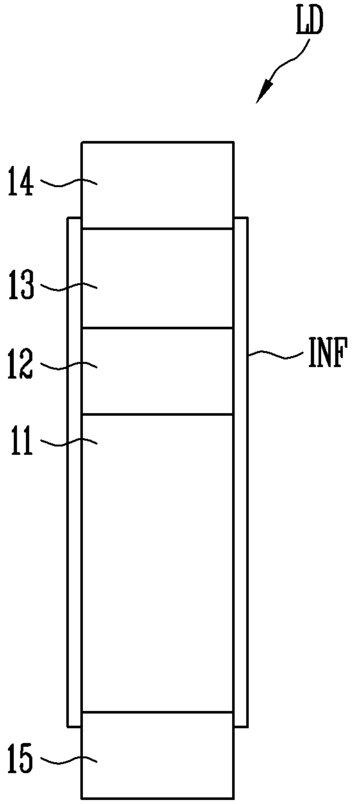

For example, as shown in FIGS. 2A and 2B, the light emitting element LD may further include at least one electrode layer 14 disposed on the first end of the second conductivity type semiconductor layer 13. In an embodiment, as shown in FIGS. 3A and 3B, the light emitting element LD may further include at least one electrode layer 15 disposed on the first end of the first conductivity type semiconductor layer 11.

Each of the electrode layers 14 and 15 may be an ohmic contact electrode, but it is not limited thereto. Furthermore, each of the electrode layers 14 and 15 may include metal or a metal oxide. For example, Cr, Ti, Al, Au, Ni, ITO, IZO, ITZO, and an oxide or alloy thereof may be used alone or in combination with each other. In an embodiment, the electrode layers 14 and 15 may be substantially transparent or translucent. Thereby, light generated from the light emitting element LD may be emitted to the outside of the light emitting element LD after passing through the electrode layers 14 and 15.

In an embodiment, the insulating film INF may at least partially enclose the outer surfaces of the electrode layers 14 and 15, or may not enclose them. In other words, the insulating film INF may be selectively formed or disposed on the surfaces of the electrode layers 14 and 15. Furthermore, the insulating film INF may be formed to expose the opposite ends of the light emitting element LD that have different polarities, and may expose at least a region of each of the electrode layers 14 and 15, for example. Alternatively, in an embodiment, the insulating film INF may not be provided.

If the insulating film INF is provided or disposed on the surface of the light emitting element LD, for example, on the surface of the active layer 12, the active layer 12 may be prevented from short-circuiting with at least one electrode (not shown), for example, at least one contact electrode of contact electrodes electrically connected or coupled to the opposite ends of the light emitting element LD, for example. Consequently, the electrical stability of the light emitting element LD may be secured.

Furthermore, thanks to the insulating film INF formed or disposed on the surface of the light emitting element LD, occurrence of a defect on the surface of the light emitting element LD may be minimized, whereby the lifetime and efficiency of the light emitting element LD may be improved. For example, if the insulating film INF is formed or disposed on each light emitting element LD, even in a case that a plurality of light emitting elements LD may be disposed adjacent to each other, the undesired short-circuiting between the light emitting elements LD may be prevented.

In an embodiment, the light emitting element LD may be manufactured through a surface treatment process. For example, the light emitting element LD may be surface-treated (for example, through a coating process) so that, in a case that a plurality of light emitting elements LD may be mixed with a fluidic solution and then supplied to each emission region (for example, emission region of each pixel), the light emitting elements LD may be evenly distributed rather than unevenly aggregating in solution.

A light emitting device including the light emitting element LD described above may be used in various devices including a display device which requires a light source. For instance, at least one subminiature light emitting element LD, for example, a plurality of subminiature light emitting elements LD each having a size ranging from a nano scale to a micro scale, may be disposed in each pixel region of a display panel so as to form a light source (or, a light source unit) of the corresponding pixel. Furthermore, the field of application of the light emitting element LD according to the disclosure is not limited to the display device. For example, the light emitting element LD may also be used in various devices such as a lighting device, which requires a light source.

Figure 4:
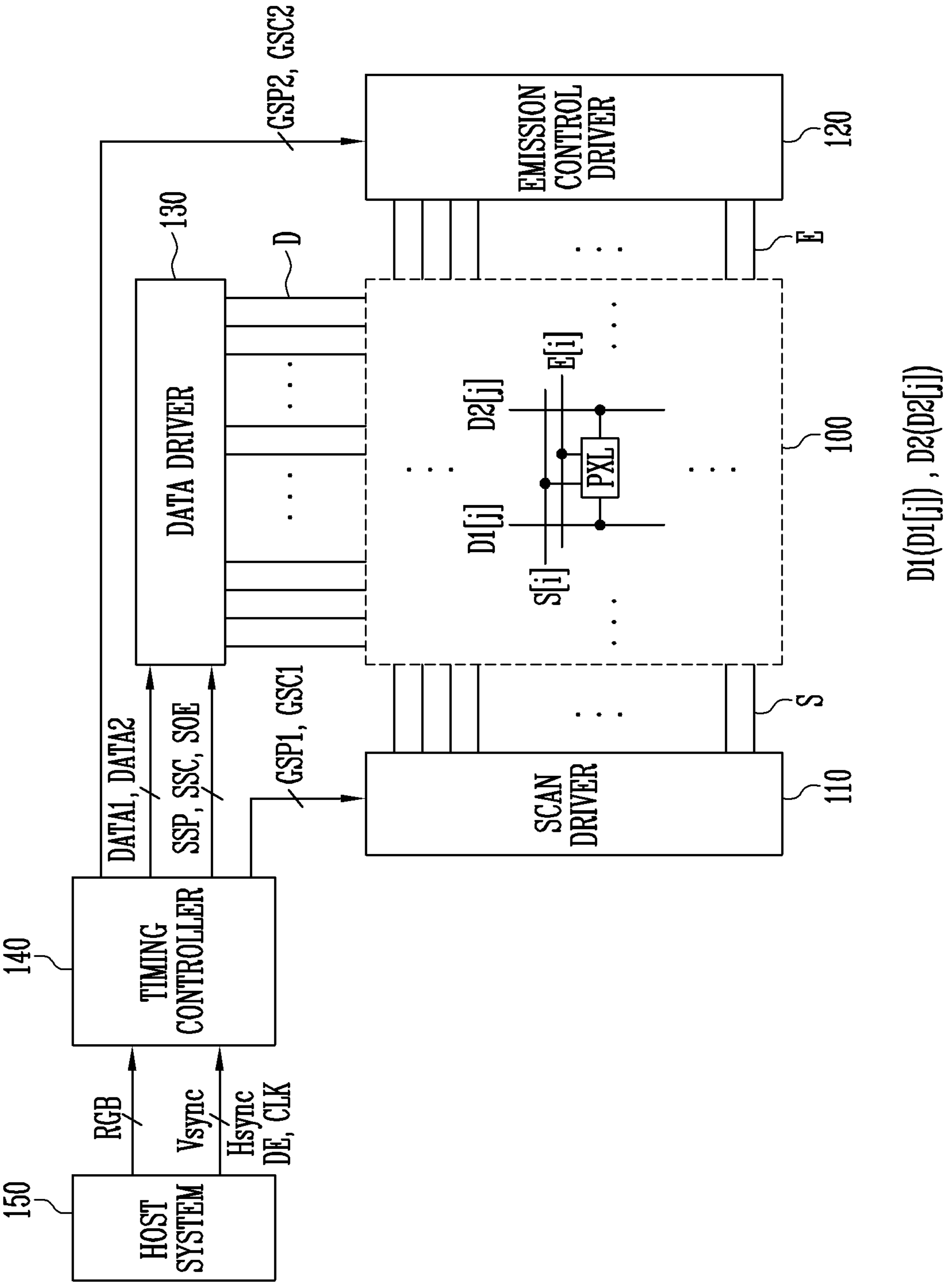
FIG. 4 illustrates a display device in accordance with an embodiment.

FIG. 4 illustrates a display device in accordance with an embodiment.

Referring to FIG. 4, the display device in accordance with an embodiment may include a pixel unit 100, a scan driver 110, an emission control driver 120, a data driver 130, a timing controller 140, and a host system 150.

The pixel unit 100 may include scan lines S, emission control lines E, data lines D, and a plurality of pixels PXL electrically connected or coupled to the scan lines S, the emission control lines E and the data lines D. Herein, the term "coupling" may comprehensively mean physical and/or electrical coupling. Similarly, the term "connecting" or "connection" may comprehensively mean physical and/or electrical connecting or connection. For instance, the pixels PXL may be electrically connected or coupled to the scan lines S, the emission control lines E, and the data lines D.

In an embodiment, each pixel PXL may be electrically connected to the plurality of data lines D to which different kinds of data signals may be supplied, in addition to at least one scan line S and emission control line E. For example, a pixel PXL disposed on an i-th (i is a natural number) horizontal line (for example, i-th horizontal pixel row) of the pixel unit 100 and a j-th (for example, j is a natural number) vertical line (for example, j-th vertical pixel column) thereof may be electrically connected to an i-th scan line S[i], an i-th emission control line E[i], a j-th first data line D1[j], and a j-th second data line D2[j]. Furthermore, each pixel PXL may be further electrically connected to at least one control line, for example, initialization control line. In an embodiment, the initialization control line may be any one of scan lines S of a previous horizontal line, but the disclosure is not limited thereto.

In an embodiment, the pixels PXL may include a plurality of light source units for self-emission. In an embodiment, each light source unit may include at least one light emitting element, for example, at least one light emitting element LD according to any one of embodiments of FIGS. 1A to 3B. In other words, each pixel PXL in accordance with an embodiment may include a plurality of light emitting elements LD divided into at least two groups. In an embodiment, the light emitting elements LD provided or disposed in each pixel PXL may be substantially rod-shaped light emitting diodes each having a size corresponding to a range from a nano-scale size to a micro-scale size, but the disclosure is not limited thereto.

Each pixel PXL receives a first data signal from each first data line D1 when a scan signal is supplied to a scan line S of a corresponding horizontal line, and emits light having luminance corresponding to the first data signal. Furthermore, in an embodiment, each pixel PXL receives a second data signal from each second data line D2 when the scan signal is supplied thereto, and selectively drives at least some or a predetermined number of the plurality of light source units in response to the second data signal. For instance, when a low gray scale that may be about equal to or less than a predetermined reference gray-scale value is expressed, each pixel PXL may interrupt electrical connection between some or a predetermined number of the light source units and a drive transistor in response to the second data signal, and supply a driving current to only the remaining light source units, thus expressing a corresponding gray scale. In this case, as compared with a comparative example in which all of the plurality of light source units may be driven in the same gray scale, a larger driving current may flow through each light emitting element LD. According to an embodiment, a gray scale may be more precisely expressed even in a low gray-scale region.

The scan driver 110 supplies a scan signal to scan lines S, in response to a first gate control signal supplied from the timing controller 140. For instance, the scan driver 110 may receive a first gate start pulse GSP1 and a first gate shift clock GSC1 from the timing controller 140, and sequentially output the scan signal to the scan lines S in response thereto. The pixels PXL may be selected in units of a horizontal line by the scan signal, and the selected pixels PXL receive first and second data signals from the first and second data lines D1 and D2, respectively. In an embodiment, the scan driver 110 may be formed or disposed or mounted in a display panel including the pixel unit 100, or be mounted in a separate circuit board to be electrically connected or coupled to the display panel via a pad component.

The emission control driver 120 supplies an emission control signal to emission control lines E, in response to a second gate control signal supplied from the timing controller 140. For instance, the emission control driver 120 may receive a second gate start pulse GSP2 and a second gate shift clock GSC2 from the timing controller 140, and sequentially output the emission control signal to the emission control lines E in response thereto.

In an embodiment, the emission control signal may have a predetermined gate-off voltage. The pixels PXL receiving the emission control signal may be controlled such that they do not emit light in units of a horizontal line, and be set in a state where they may emit light during the remaining period (for example, a period in which the emission control signal has a predetermined gate-on voltage) in which the supply of the emission control signal is stopped. In an embodiment, the emission control driver 120 may be formed or disposed or mounted in the display panel, or be mounted in the separate circuit board to be electrically connected or coupled to the display panel via the pad component. Furthermore, in an embodiment, the emission control driver 120 may be integrated with the scan driver 110, or be formed or disposed or mounted separately from the scan driver 110.

The data driver 130 supplies each first data signal to each first data line D1, and supplies each second data signal to each second data line D2, in response to first and second data DATA1 and DATA2 supplied from the timing controller 140 and the data control signal. For instance, the data driver 130 may receive first and second data DATA1 and DATA2, a source start pulse SSP, a source sampling clock SSC, and a source output enable signal SOE from the timing controller 140, and may output each of the first and second data signals to each of the first and second data lines D1 and D2 in response thereto.

The timing controller 140 controls the scan driver 110, the emission control driver 120, and the data driver 130, in response to image data RGB and timing signals supplied from a host system 150. For instance, the timing controller 140 may supply the first and second gate control signals to the scan driver 110 and the emission control driver 120, respectively, and may supply the first and second data DATA1 and DATA2 and the data control signal to the data driver 130, based on timing signals such as image data RGB, a vertical synchronization signal Vsync, a horizontal synchronization signal Hsync, a data enable signal DE, and a clock signal CLK.

The first gate control signal may include a first gate start pulse GSP1, and one or more first gate shift clocks GSC1. The first gate start pulse GSP1 controls the supply timing of a first scan signal. The first gate shift clock GSC1 means one or more clock signals for shifting the first gate start pulse GSP1.

The second gate control signal may include a second gate start pulse GSP2, and one or more second gate shift clocks GSC2. The second gate start pulse GSP2 controls the supply timing of a first emission control signal. The second gate shift clock GSC2 means one or more clock signals for shifting the second gate start pulse GSP2.

The data control signal may include a source start pulse SSP, a source sampling clock SSC, a source output enable signal SOE, etc. The source start pulse SSP controls a data sampling start timing of the data driver 130. The source sampling clock SSC controls a sampling operation of the data driver 130 based on a rising or falling edge. The source output enable signal SOE controls an output timing of the data driver 130.

Furthermore, the timing controller 140 may generate the first and second data DATA1 and DATA2 using the image data RGB, and may supply the first and second data DATA1 and DATA2 to the data driver 130. For instance, the timing controller 140 may process the image data RGB to generate the first data DATA1, and may compare the image data RGB with a predetermined reference gray-scale value to generate the second data DATA2.

The host system 150 supplies the image data RGB to the timing controller 140 through a predetermined interface. The host system 150 may supply various timing signals, such as Vsync, Hsync, DE, and CLK, to the timing controller 140.

In the display device according to the above-described embodiment, each pixel PXL may be electrically connected or coupled to a pair of first and second data lines D1 and D2. Thus, the pixel unit 100 may include data lines D which may be twice as many as the vertical lines, and the data driver 130 may be provided with data channels corresponding to the data lines D, respectively. For instance, assuming that the pixel unit 100 may include a plurality of pixels PXL disposed on n (n is a natural number equal to or more than two) horizontal lines and m (m is a natural number equal to or more than two) vertical lines, n scan lines S electrically connected or coupled to pixels PXL disposed on at least each horizontal line and m first data lines D1 and m second data lines D2 each electrically connected or coupled to pixels PXL disposed on each vertical line may be disposed in the pixel unit 100.

In this case, the data driver 130 may be provided with 2m data channels that may be electrically connected or coupled to different data lines D among m first data lines D1 and m second data lines D2. Such a data driver 130 supplies the first data signal to each first data line D1 to drive the pixels PXL with luminance corresponding to the image data RGB, and supplies the second data signal to each second data line D2 to selectively drive at least some or a predetermined number of the plurality of light source units provided or disposed in each of the pixels PXL.

According to an embodiment, the gray scale may be more accurately expressed even in the low gray-scale region, and thus, the low gray-scale expressiveness of the pixel PXL and the display device including the same may be improved. The structure and driving method of each pixel PXL, the data driver 130 and the timing controller 140 will be described later in detail.

Figure 5:
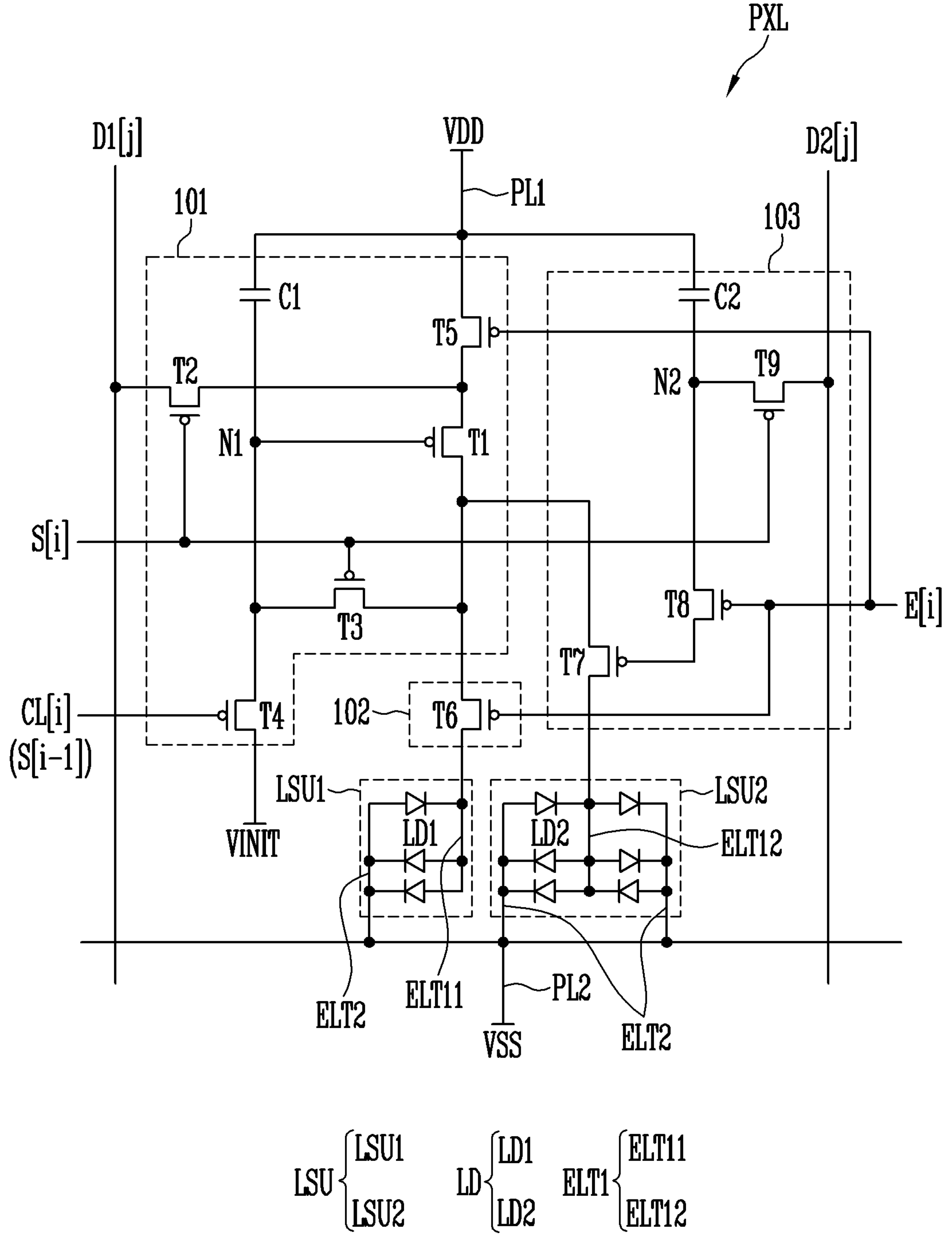
FIG. 5 illustrates an equivalent circuit diagram of a pixel in accordance with an embodiment.

FIG. 5 illustrates an equivalent circuit diagram of a pixel PXL in accordance with an embodiment. For instance, FIG. 5 is an equivalent circuit diagram illustrating an embodiment of the pixel PXL that may be provided or disposed in the display device of FIG. 4. For convenience, FIG. 5 illustrates the pixel PXL disposed on an i-th row and a j-th column of the pixel unit 100 shown in FIG. 4. In an embodiment, the pixels PXL disposed in the pixel unit 100 may have substantially the same structure, but the disclosure is not limited thereto.

Referring to FIGS. 4 and 5, the pixel PXL in accordance with an embodiment may include a plurality of light source units LSU, for instance, first and second light source units LSU1 and LSU2. Furthermore, the pixel PXL may include a driving-current generator 101 for controlling the driving of the light source units LSU, a first switching unit 102, and a second switching unit 103.

A first light source unit LSU1 may include at least one first light emitting element LD1 electrically connected or coupled between a first split electrode ELT11 and a second power supply VSS. For example, the first light source unit LSU1 may include the first split electrode ELT11, a second pixel electrode ELT2 spaced apart from the first split electrode ELT11, and a plurality of first light emitting elements LD1 electrically connected or coupled in parallel between the first split electrode ELT11 and the second pixel electrode ELT2.

In an embodiment, the first split electrode ELT11 and a second split electrode ELT12 provided or disposed in the second light source unit LSU2 may constitute or form a first pixel electrode ELT1 of each pixel PXL. The first and second split electrodes ELT11 and ELT12 may be separated and spaced apart from each other in an emission region of the corresponding pixel PXL, and may be electrically connected or coupled to different switching elements. For instance, the first split electrode ELT11 may be electrically connected or coupled via a sixth transistor T6 of the first switching unit 102 to the driving-current generator 101, and the second split electrode ELT12 may be electrically connected or coupled via a seventh transistor T7 of the second switching unit 103 to the driving-current generator 101.

In an embodiment, the second pixel electrode ELT2 may be electrically connected or coupled through a second power line PL2 to the second power supply VSS. In an embodiment, the second power supply VSS may be a low-potential pixel power supply. In an embodiment, the second pixel electrode ELT2 may be electrically connected or coupled in common between a first end of each of the first and second light emitting elements LD1 and LD2 and the second power supply VSS.

In an embodiment, at least one first light emitting element LD1 provided or disposed in the first light source unit LSU1 may be electrically connected or coupled in a forward direction between the first split electrode ELT11 and the second pixel electrode ELT2, broadly between the first power supply VDD and the second power supply VSS. In an embodiment, the first power supply VDD may be a high-potential pixel power supply, and may have a potential equal to or higher than a threshold voltage of each light emitting element LD (for example, each first or second light emitting element LD1 or LD2) as compared with the potential of the second power supply VSS. At least one first light emitting element LD1 electrically connected or coupled in the forward direction emits light having luminance corresponding to the driving current, when the driving current is supplied from the driving-current generator 101.

In an embodiment, each first light emitting element LD1 may be a subminiature light emitting diode. For instance, each first light emitting element LD1 may be a substantially rod-shaped light emitting diode having a size corresponding to a range from a nano-scale size to a micro-scale size. In the disclosure, the type and/or shape of the first light emitting elements LD1 are not particularly limited, and each of the first light emitting elements LD1 may be a self-emissive element of various types and/or shapes.

A second light source unit LSU2 may include at least one second light emitting element LD2 electrically connected or coupled between a second split electrode ELT12 and a second power supply VSS. For example, the second light source unit LSU2 may include the second split electrode ELT12, a second pixel electrode ELT2 spaced apart from the second split electrode ELT12, and a plurality of second light emitting elements LD2 electrically connected or coupled in parallel between the second split electrode ELT12 and the second pixel electrode ELT2.

In an embodiment, at least one second light emitting element LD2 provided or disposed in the second light source unit LSU2 may be electrically connected or coupled in a forward direction between the second split electrode ELT12 and the second pixel electrode ELT2, broadly between the first power supply VDD and the second power supply VSS. At least one second light emitting element LD2 electrically connected or coupled in the forward direction emits light having luminance corresponding to the driving current, when the driving current is supplied from the driving-current generator 101.

In an embodiment, each second light emitting element LD2 may be a subminiature light emitting diode. For instance, each second light emitting element LD2 may be a substantially rod-shaped light emitting diode having a size corresponding to a range from a nano-scale size to a micro-scale size. In the disclosure, the type and/or shape of the second light emitting elements LD2 are not particularly limited, and each of the second light emitting elements LD2 may be a self-emissive element of various types and/or shapes.

In an embodiment, the second light emitting elements LD2 may be the same type as the first light emitting elements LD1, but the disclosure is not limited thereto. Furthermore, the first and second light emitting elements LD1 and LD2 may have substantially the same or similar size and/or shape, but the disclosure is not limited thereto.

The driving-current generator 101 may be electrically connected or coupled between the first power supply VDD and the first and second light source units LSU1 and LSU2. Furthermore, the driving-current generator 101 may be electrically connected or coupled to at least one scan line including a scan line S of a corresponding horizontal line, for example, an i-th scan line S[i] (hereinafter, referred to as a "scan line" or a "current scan line") and a first data line D1 of a corresponding vertical line, for example, a j-th first data line D1[j] (hereinafter, referred to as a "first data line"). Such a driving-current generator 101 generates a driving current corresponding to the first data signal supplied to the first data line D1[j].

In an embodiment, the driving-current generator 101 may include first to fifth transistors T1 to T5, and a first capacitor C1. In an embodiment, the first to fifth transistors T1 to T5 may be of the same type. For instance, all of the first to fifth transistors T1 to T5 may be P-type transistors. However, the disclosure is not limited thereto. For example, in an embodiment, all of the first to fifth transistors T1 to T5 may be N-type transistors. Alternatively, some or a predetermined number of the first to fifth transistors T1 to T5 may be P-type transistors, while the remaining transistors may be N-type transistors.

The first transistor T1 is a drive transistor of each pixel PXL, and may be electrically connected or coupled between the first power supply VDD and the first and second light source units LSU1 and LSU2. For instance, the first transistor T1 may include a first electrode (for example, a source electrode) electrically connected or coupled via the fifth transistor T5 and the first power line PL1 to the first power supply VDD, a second electrode (for example, a drain electrode) electrically connected or coupled through the sixth and seventh transistors T6 and T7 to the first and second light source units LSU1 and LSU2, and a gate electrode electrically connected or coupled to the first node N1. In an embodiment, the second electrode of the first transistor T1 may be electrically connected or coupled in common to the sixth and seventh transistors T6 and T7. Such a first transistor T1 generates a driving current corresponding to the first data signal supplied via the first data line D1[j] to the first node N1.

The second transistor T2 may be electrically connected or coupled between the first data line D1[j] and the first electrode of the first transistor T1, and the gate electrode of the second transistor T2 may be electrically connected or coupled to the scan line S[i]. Such a second transistor T2 is turned on, when the scan signal (hereinafter also referred to as a "current scan signal) of a gate-on voltage is supplied from the scan line S[i]. When the second transistor T2 is turned on, a first data signal supplied to the first data line D1[j] may be transmitted to the first electrode of the first transistor T1.

The third transistor T3 may be electrically connected or coupled between the second electrode of the first transistor T1 and the first node N1, and the gate electrode of the third transistor T3 is electrically connected or coupled to the scan line S[i]. Such a third transistor T3 is turned on, when the scan signal of the gate-on voltage is supplied from the scan line S[i]. When the third transistor T3 is turned on, the first transistor T1 may be electrically connected in the form of a diode.

The fourth transistor T4 may be electrically connected or coupled between the first node N1 and the initialization power supply VINIT, and the gate electrode of the fourth transistor T4 may be electrically connected or coupled to the initialization control line of the corresponding horizontal line, for example, an i-th initialization control line CL[i] (hereinafter, referred to as an "initialization control line"). In an embodiment, the initialization control line CL[i] may be any one of the scan lines S of the previous horizontal line. For instance, the i-th initialization control line CL[i] may be a current scan line of an immediately previous horizontal line, for example, an i−1-th scan line S[i−1] (also referred to as a "previous scan line"). However, the disclosure is not limited thereto. For example, in an embodiment, initialization control lines CL[i] may be provided separately from the scan lines S. Such a fourth transistor T4 is turned on, when the initialization control signal (for example, the previous scan signal of the gate-on voltage) of the gate-on voltage is supplied to the initialization control line CL[i]. When the fourth transistor T4 is turned on, the first node N1 is initialized to the voltage of the initialization power supply VINT. In an embodiment, the voltage of the initialization power supply VINT may be equal to or less than the lowest voltage of the first data signal. For instance, the voltage of the initialization power supply VINT may be lower than the lowest voltage of the first data signal by the threshold voltage of the first transistor T1 or more. Thus, during each frame period, regardless of the voltage of the first data signal supplied in a previous frame period, the first data signal may be stably supplied to the first node N1.

The fifth transistor T5 may be electrically connected or coupled between the first power supply VDD and the first electrode of the first transistor T1, and the gate electrode of the fifth transistor T5 may be electrically connected or coupled to the emission control line of the corresponding horizontal line, for example, an i-th emission control line E[i] (hereinafter, referred to as an "emission control line"). Such a fifth transistor T5 is turned off when the emission control signal of the gate off voltage is supplied to the emission control line E[i], and is turned on in other cases (for example, when the voltage of the emission control signal is a gate-on voltage). When the fifth transistor T5 is turned off, an electrical connection between the first power supply VDD and the first transistor T1 may be interrupted. When the fifth transistor T5 is turned on, the first transistor T1 may be electrically connected or coupled to the first power supply VDD.

The first capacitor C1 may be electrically connected between the first power supply VDD and the first node N1. Such a first capacitor C1 charges a voltage corresponding to the first data signal transmitted to the first node N1 per each frame period (by way of example, the data programming period of each frame) and the threshold voltage of the first transistor T1, and maintains the charged voltage until the first data signal of a next frame is supplied.

Meanwhile, the configuration of the driving-current generator 101 is not limited to an embodiment shown in FIG. 5. For example, the driving-current generator 101 may have a configuration corresponding to a pixel circuit of various structures.

The first switching unit 102 may include at least one switching element electrically connected or coupled between the driving-current generator 101 and the first light source unit LSU1, for example, the sixth transistor T6 (also referred to as a "first switching element"). The sixth transistor T6 may be electrically connected or coupled between the first transistor T1 and the first split electrode ELT11, and the gate electrode of the sixth transistor T6 may be electrically connected or coupled to the emission control line E[i]. The sixth transistor T6 may be turned off when the emission control signal of the gate-off voltage is supplied to the emission control line E[i], and may be turned on in the other cases. When the sixth transistor T6 is turned off, an electrical connection between the first transistor T1 and the first light source unit LSU1 (for example, the first split electrode ELT11 of the first light source unit LSU1) may be interrupted. When the sixth transistor T6 is turned on, the first light source unit LSU1 may be electrically connected or coupled to the first transistor T1 and the driving current from the first transistor T1 is supplied to the first light source unit LSU1.

The second switching unit 103 may include at least one switching element electrically connected or coupled between the driving-current generator 101 and the second light source unit LSU2, for example, the seventh transistor T7 (also referred to as a "second switching element"). Furthermore, the second switching unit 103 may further include eighth and ninth transistors T8 and T9 for controlling the operation of the seventh transistor T7, and a second capacitor C2. In an embodiment, the second switching unit 103 may be electrically connected or coupled to the second data line D2 of the corresponding vertical line, for example, a j-th second data line D2[j] (hereinafter, a "second data line"). Such a second switching unit 103 may control an electrically connection between the driving-current generator 101 (for example, the first transistor T1 that may be the drive transistor of each pixel PXL) and the second light source unit LSU2, in response to the second data signal supplied to the second data line D2[j].

The seventh transistor T7 may be electrically connected or coupled between the first transistor T1 and the second split electrode ELT12, and the gate electrode of the seventh transistor T7 may be electrically connected or coupled via the eighth transistor T8 to the second node N2. Such a seventh transistor T7 may control an electrical connection between the first transistor T1 and the second light source unit LSU2, in response to the second data signal supplied to the second data line D2[j].

For example, when the second data signal of the gate-on voltage is transmitted to the gate electrode of the seventh transistor T7 through the second data line D2[j] and the eighth transistor T8, the seventh transistor T7 may be turned on. When the seventh transistor T7 is turned on, the second light source unit LSU2 may be electrically connected or coupled to the first transistor T1. Thus, the driving current from the first transistor T1 is supplied to the second light source unit LSU2.

Meanwhile, when the second data signal of the gate-off voltage is transmitted to the gate electrode of the seventh transistor T7 through the second data line D2[j] and the eighth transistor T8, the seventh transistor T7 may be turned off. When the seventh transistor T7 is turned off, an electrical connection between the first transistor T1 and the second light source unit LSU2 (for example, the second split electrode ELT12 of the second light source unit LSU2) is interrupted, and the inflow of the driving current into the second light source unit LSU2 is interrupted.

The eighth transistor T8 may be electrically connected or coupled between the gate electrode of the seventh transistor T7 and the second node N2, and the gate electrode of the eighth transistor T8 may be electrically connected or coupled to the emission control line E[i]. The eighth transistor T8 is turned off when the emission control signal of the gate-off voltage is supplied to the emission control line E[i], and is turned on in the other cases. When the eighth transistor T8 is turned off, an electrically connection between the gate electrode of the seventh transistor T7 and the second node N2 may be interrupted. When the eighth transistor T8 is turned on, the gate electrode of the seventh transistor T7 may be electrically connected or coupled to the second node N2, and the voltage of the second node N2 may be transmitted to the gate electrode of the seventh transistor T7.

The ninth transistor T9 may be electrically connected or coupled between the second data line D2[j] and the second node N2, and the gate electrode of the ninth transistor T9 may be electrically connected or coupled to the scan line S[i]. Such a ninth transistor T9 is turned on, when the scan signal of the gate-on voltage is supplied from the scan line S[i]. When the ninth transistor T9 is turned on, a second data signal supplied to the second data line D2[j] is transmitted to the second node N2.

The second capacitor C2 may be electrically connected between the first power supply VDD and the second node N2. Such a second capacitor C2 charges a voltage corresponding to the second data signal transmitted to the second node N2 per each frame period (by way of example, the data programming period of each frame) and the threshold voltage of the first transistor T1, and maintains the charged voltage until the second data signal of a next frame is transmitted.

The pixel PXL in accordance with the above-described embodiment may include a plurality of light source units LSU electrically connected or coupled to different split electrodes. For example, the pixel PXL may include the first and second light source units LSU1 and LSU2 that may be separately electrically connected or coupled to the first and second split electrodes ELT11 and ELT12. The first and second switching units 102 and 103 may be electrically connected or coupled between the first transistor T1 for generating the driving current of the pixel PXL and the first and second light source units LSU1 and LSU2.

According to an embodiment, at least some or a predetermined number of the first and second light source units LSU1 and LSU2 may be selectively driven for each pixel PXL in each frame period, by supplying the second data signal of the gate-on voltage or the gate-off voltage to each pixel PXL in each frame period through the second data line D2[j]. For instance, by supplying the second data signal of the gate-off voltage during a corresponding period for a pixel PXL that should express a low gray scale equal to or less than a predetermined gray scale, a control may be performed such that a driving current flows to only the first light source unit LSU1. Thus, it may be possible to increase the amount of current flowing through each light emitting element LD, for example, at least one first light emitting element LD1 electrically connected to the first light source unit LSU1 in the forward direction. According to an embodiment, it may be possible to overcome a difficulty in controlling the light emission of each light emitting element LD with a minute current, and to more precisely express a desired gray scale. In other words, according to an embodiment, the gray scale may be more precisely expressed even in a low gray-scale region.

Figure 6A:
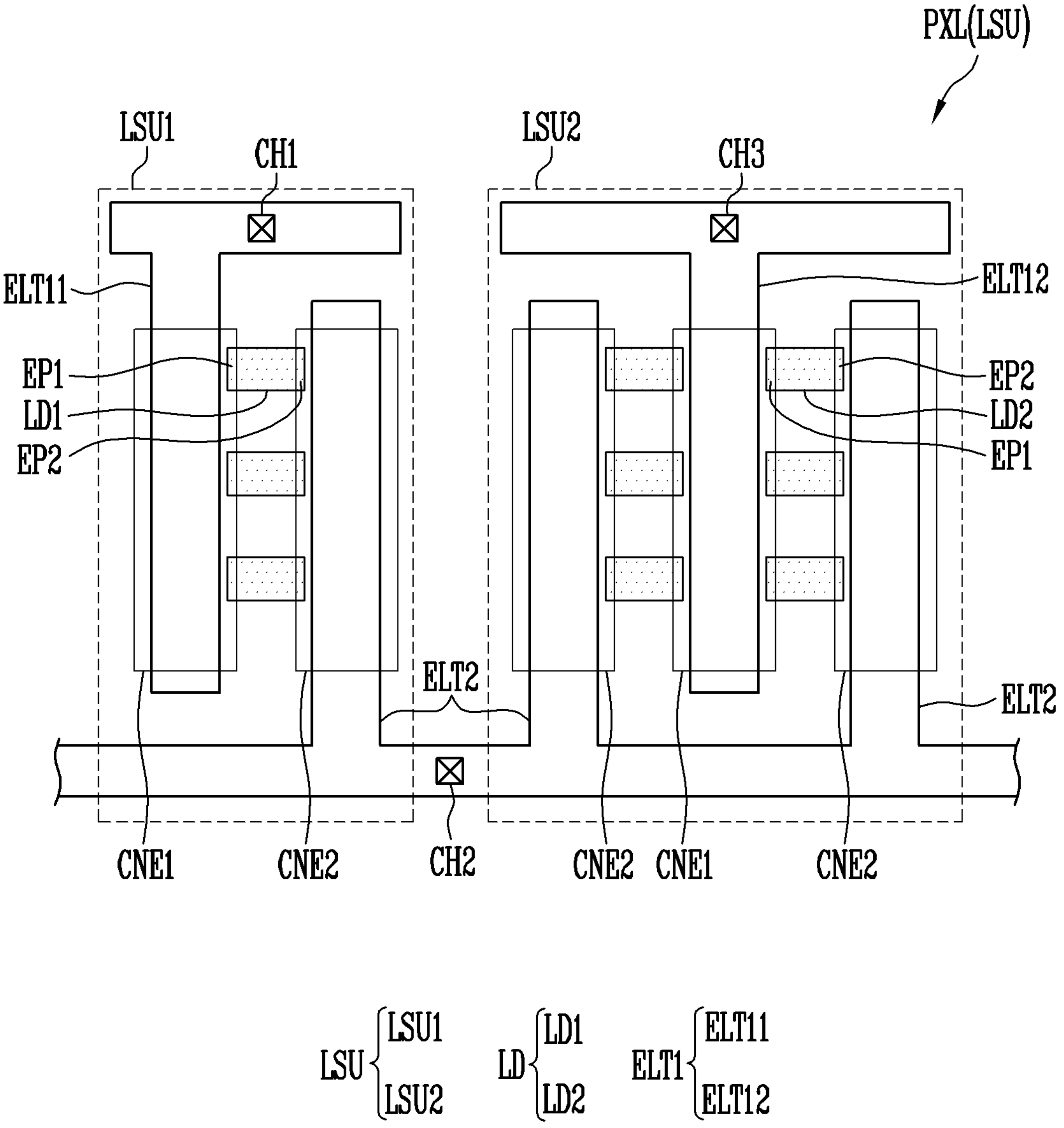
FIGS. 6A and 6B each illustrate an embodiment of a light source unit of the pixel shown in FIG. 5.
Figure 6B:
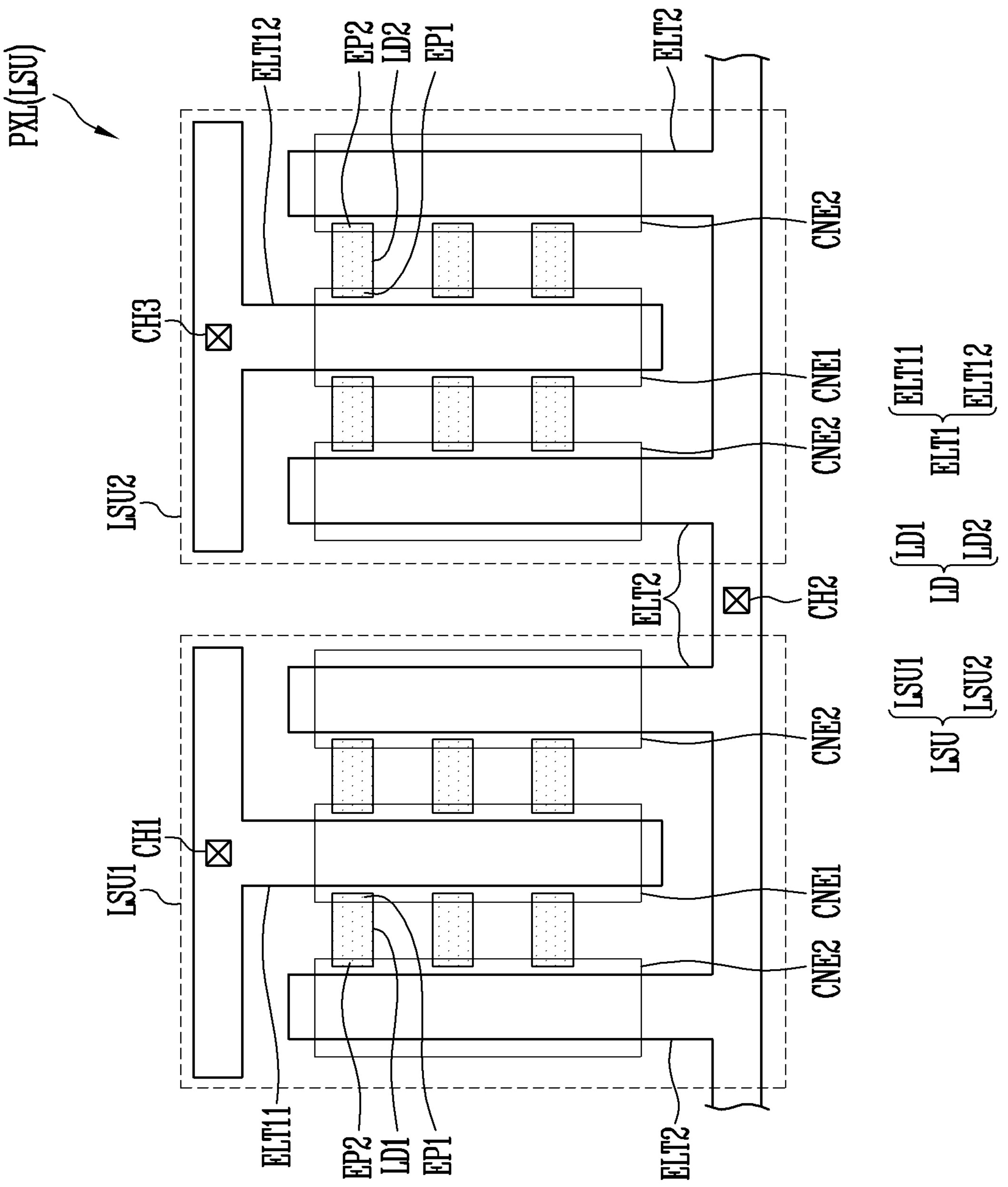

FIGS. 6A and 6B each illustrate an embodiment of a light source unit LSU of the pixel PXL shown in FIG. 5. In detail, FIGS. 6A and 6B are plan views illustrating different embodiments related to the structure and arrangement of the first and second light source units LSU1 and LSU2. For convenience, FIGS. 6A and 6B illustrate only a display element layer in which the first and second light source units LSU1 and LSU2 may be arranged or disposed. Each pixel PXL may further include circuit elements (for example, at least some or a predetermined number of circuit elements of the first to ninth transistors T1 to T9 and the first and second capacitors C1 and C2 of FIG. 5) for controlling the first and second light source units LSU1 and LSU2. The circuit elements may be disposed in the pixel circuit layer or the like disposed under or below the display element layer, but the position of the circuit elements is not limited thereto.

Referring to FIGS. 6A and 6B together with FIGS. 1A to 5, each pixel PXL may include a plurality of light source units LSU, for example, at least first and second light source units LSU1 and LSU2.

In an embodiment, the first light source unit LSU1 may include a first split electrode ELT11, a second pixel electrode ELT2, and at least one first light emitting element LD1 electrically connected or coupled therebetween. For instance, the first light source unit LSU1 may include the first split electrode ELT11 and the second pixel electrode ELT2 disposed in the emission region of the corresponding pixel PXL to be spaced apart from each other, and a plurality of first light emitting elements LD1 electrically connected or coupled in parallel between the first split electrode ELT11 and the second pixel electrode ELT2.

In an embodiment, the first split electrode ELT11 may be electrically connected or coupled to one end (hereinafter, referred to as a “first end EP1”) of each of the first light emitting elements LD1. For instance, the first split electrode ELT11 may be in direct contact with and/or be directly electrically connected or coupled to the first end EP1 of each of the first light emitting elements LD1, or may be electrically connected or coupled to the first end EP1 of each of the first light emitting elements LD1 through at least one first contact electrode CNE1.

Furthermore, the first split electrode ELT11 may be electrically connected or coupled to at least one circuit element forming the pixel circuit of the corresponding pixel PXL. For instance, the first split electrode ELT11 may be electrically connected or coupled, via the first contact hole CH1, to the sixth transistor T6 of FIG. 5.

However, the disclosure is not limited thereto. For example, in an embodiment, the first split electrode ELT11 may be electrically connected or coupled through the first contact hole CH1 to the second power supply VSS, and the second pixel electrode ELT2 may be electrically connected or coupled through the second contact hole CH2 to the sixth transistor T6 of FIG. 5. Alternatively, in an embodiment, either of the first split electrode ELT11 and the second pixel electrode ELT2 may be directly electrically connected or coupled to the first power line PL1 or the second power line PL2 without passing through a contact hole or a circuit element.

At least one region of the first split electrode ELT11 may be disposed to be opposite to at least one region of the second pixel electrode ELT2, and a plurality of first light emitting elements LD1 may be electrically connected or coupled between the first split electrode ELT11 and the second pixel electrode ELT2. In the disclosure, a direction in which the first light emitting elements LD1 may be arranged or disposed is not particularly limited. Furthermore, the first light emitting elements LD1 may be electrically connected or coupled in series and/or in parallel between the first split electrode ELT11 and the second pixel electrode ELT2.

In an embodiment, the second pixel electrode ELT2 may be electrically connected or coupled to the other end (hereinafter, referred to as a “second end EP2”) of each of the first light emitting elements LD1. For instance, the second pixel electrode ELT2 may be in direct contact with and/or be directly electrically connected or coupled to the second end EP2 of each of the first light emitting elements LD1, or may be electrically connected or coupled to the second end EP2 of each of the first light emitting elements LD1 through at least one second contact electrode CNE2.

Furthermore, the second pixel electrode ELT2 may be electrically connected to the second power supply VSS. For instance, the second pixel electrode ELT2 may be electrically connected or coupled through the second contact hole CH2 and the second power line PL2 to the second power supply VSS.

In an embodiment, the second pixel electrode ELT2 may be formed in common on the first and second light source units LSU1 and LSU2. For example, the second pixel electrode ELT2 may be electrically connected or coupled in common between the second end EP2 of each of the first and second light emitting elements LD1 and LD2 and the second power supply VSS.

Each of the first light emitting elements LD1 may be formed of a light emitting diode which is made of material having an inorganic crystal structure and has a subminiature size, for example, ranging from a nano scale to a micro scale. For example, each of the first light emitting elements LD1 may be a subminiature substantially rod-shaped light emitting diode in accordance with any one of embodiments of FIGS. 1A to 3B.

In an embodiment, at least one contact electrode may be electrically connected or coupled to each of both ends of the first light emitting elements LD1. For example, at least one first contact electrode CNE1 may be electrically connected or coupled to the first end EP1 of each of the first light emitting elements LD1, and at least one second contact electrode CNE2 may be electrically connected or coupled to the second end EP2 of each of the first light emitting elements LD1.

In an embodiment, the second light source unit LSU2 may include a second split electrode ELT12, a second pixel electrode ELT2, and at least one second light emitting element LD2 electrically connected or coupled therebetween. For instance, the second light source unit LSU2 may include the second split electrode ELT12 and the second pixel electrode ELT2 disposed in the emission region of the corresponding pixel PXL to be spaced apart from each other, and a plurality of second light emitting elements LD2 electrically connected or coupled in parallel between the second split electrode ELT12 and the second pixel electrode ELT2.

In an embodiment, the second split electrode ELT12 may be electrically connected or coupled to one end (hereinafter, referred to as a “first end EP1”) of each of the second light emitting elements LD2. For instance, the second split electrode ELT12 may be in direct contact with and/or be directly electrically connected or coupled to the first end EP1 of each of the second light emitting elements LD2, or may be electrically connected or coupled to the first end EP1 of each of the second light emitting elements LD2 through at least one first contact electrode CNE1.

Furthermore, the second split electrode ELT12 may be electrically connected or coupled to at least one circuit element forming the pixel circuit of the corresponding pixel PXL. For instance, the second split electrode ELT12 may be electrically connected or coupled, via the third contact hole CH3, to the seventh transistor T7 of FIG. 5.

However, the disclosure is not limited thereto. For example, in an embodiment, the second split electrode ELT12 may be electrically connected or coupled through the third contact hole CH3 to the second power supply VSS, and the second pixel electrode ELT2 may be electrically connected or coupled through the second contact hole CH2 to the seventh transistor T7 of FIG. 5. Alternatively, in an embodiment, either of the second split electrode ELT12 and the second pixel electrode ELT2 may be directly electrically connected or coupled to the first power line PL1 or the second power line PL2 without passing through a contact hole or a circuit element.

At least one region of the second split electrode ELT12 may be disposed to be opposite to at least one region of the second pixel electrode ELT2, and a plurality of second light emitting elements LD2 may be electrically connected or coupled between the second split electrode ELT12 and the second pixel electrode ELT2. In the disclosure, a direction in which the second light emitting elements LD2 may be arranged or disposed is not particularly limited. Furthermore, the second light emitting elements LD2 may be electrically connected or coupled in series and/or in parallel between the second split electrode ELT12 and the second pixel electrode ELT2.

In an embodiment, the second pixel electrode ELT2 may be electrically connected or coupled to the other end (hereinafter, referred to as a "second end EP2") of each of the second light emitting elements LD2. For instance, the second pixel electrode ELT2 may be in direct contact with and/or be directly electrically connected or coupled to the second end EP2 of each of the second light emitting elements LD2, or may be electrically connected or coupled to the second end EP2 of each of the second light emitting elements LD2 through at least one second contact electrode CNE2. Such a second pixel electrode ELT2 may be electrically connected to the second power supply VSS.

Each of the second light emitting elements LD2 may be formed of a light emitting diode which is made of material having an inorganic crystal structure and has a subminiature size, for example, ranging from a nano scale to a micro scale. For example, each of the second light emitting elements LD2 may be a subminiature substantially rod-shaped light emitting diode in accordance with any one of embodiments of FIGS. 1A to 3B.

In an embodiment, at least one contact electrode may be electrically connected or coupled to each of both ends of the second light emitting elements LD2. For example, at least one first contact electrode CNE1 may be electrically connected or coupled to the first end EP1 of each of the second light emitting elements LD2, and at least one second contact electrode CNE2 may be electrically connected or coupled to the second end EP2 of each of the second light emitting elements LD2.

In an embodiment, the first and second light emitting elements LD1 and LD2 (hereinafter, collectively referred to as "light emitting elements LD") may be prepared in the form where they may be dispersed in a predetermined solution (hereinafter, referred to as an "LED solution"), and then may be supplied to each pixel region using an inkjet method. For example, the light emitting elements LD may be mixed with a volatile solvent and supplied to the emission region of each pixel PXL. If a predetermined voltage (also referred to as "alignment voltage) is applied to the first pixel electrode ELT1 including the first and second split electrodes ELT11 and ELT12 (or the integrally connected first pixel electrode ELT1 before the first and second split electrodes ELT11 and ELT12 may be separated) and the second pixel electrode ELT2, an electric field may be generated between the first pixel electrode ELT1 and the second pixel electrode ELT2, and the light emitting elements LD may be self-aligned between them. After the light emitting elements LD may be aligned, the solvent may be removed by a volatilization method or other methods. In this way, the light emitting elements LD may be stably arranged or disposed between the first and second pixel electrodes ELT1 and ELT2.

Each of the first and second contact electrodes CNE1 and CNE2 may come into contact with and/or be electrically connected or coupled to any one of the first and second pixel electrodes ELT1 and ELT2 and at least one end of at least one of the light emitting elements LD. For example, each first contact electrode CNE1 may cover or overlap the first end EP1 of at least one first or second light emitting element LD1 or LD2, and at least one or a region of the first or second split electrode ELT11 or ELT12 corresponding to the first end EP1. By the first contact electrode CNE1, the first end EP1 of at least one first or second light emitting element LD1 or LD2 may be electrically connected or coupled to the first or second split electrode ELT11 or ELT12. Similarly, each second contact electrode CNE2 may cover or overlap the second end EP2 of at least one first or second light emitting element LD1 or LD2, and at least one region of the second pixel electrode ELT2 corresponding to the second end EP2. By the second contact electrode CNE2, the second end EP2 of at least one first or second light emitting element LD1 or LD2 may be electrically connected or coupled to the second pixel electrode ELT2.

The light emitting elements LD electrically connected or coupled between the first or second split electrode ELT11 or ELT12 and the second pixel electrode ELT2 may be gathered to form the light source unit LSU of the corresponding pixel PXL. For instance, at least one first light emitting element LD1 electrically connected or coupled in the forward direction between the first split electrode ELT11 and the second pixel electrode ELT2 may form the first light source unit LSU1, and at least one second light emitting element LD2 electrically connected or coupled in the forward direction between the second split electrode ELT12 and the second pixel electrode ELT2 may form the second light source unit LSU2. Each of the first and second light emitting elements LD1 and LD2 may emit light having luminance corresponding to the driving current, when the driving current may be supplied from the driving-current generator 101.

In an embodiment, the first and second light source units LSU1 and LSU2 may be formed or disposed in regions having the same or different area(s). In an embodiment, the first and second light source units LSU1 and LSU2 may be formed or disposed in regions having different areas, as shown in FIG. 6A. In this case, the first and second split electrodes ELT11 and ELT12 or the second pixel electrodes ELT2 disposed in the first and second light source units LSU1 and LSU2 may have different shapes, numbers and/or areas. However, the disclosure is not limited thereto. For example, even if the first and second light source units LSU1 and LSU2 may be disposed in regions having different areas, the first and second split electrodes ELT11 and ELT12 or the second pixel electrodes ELT2 disposed in the first and second light source units LSU1 and LSU2 may have the same shape, number and/or area.

In an embodiment, the first and second light source units LSU1 and LSU2 may be formed or disposed in the same area, as shown in FIG. 6B. In this case, the first and second split electrodes ELT11 and ELT12 or the second pixel electrodes ELT2 disposed in the first and second light source units LSU1 and LSU2 may have the same shape, number and/or area. However, the disclosure is not limited thereto. For example, even if the first and second light source units LSU1 and LSU2 may be disposed in regions having the same area, the first and second split electrodes ELT11 and ELT12 or the second pixel electrodes ELT2 disposed in the first and second light source units LSU1 and LSU2 may have different shapes, numbers and/or areas.

In an embodiment, the first and second light source units LSU1 and LSU2 may include first and second light emitting elements LD1 and LD2 having the same number or different numbers. In an embodiment, as illustrated in FIG. 6A, the number of the first light emitting elements LD1 disposed in the first light source unit LSU1 may be different from the number of the second light emitting elements LD2 disposed in the second light source unit LSU2.

In an embodiment, as illustrated in FIG. 6B, the number of the first light emitting elements LD1 disposed in the first light source unit LSU1 may be equal to the number of the second light emitting elements LD2 disposed in the second light source unit LSU2.

Furthermore, in an embodiment, the first light source unit LSU1 may include a plurality of first light emitting elements LD1 electrically connected or coupled between the first split electrode ELT11 and the second pixel electrode ELT2 in different directions. For instance, some or a predetermined number of the first light emitting elements LD1 may be electrically connected or coupled in a forward direction between the first split electrode ELT11 and the second pixel electrode ELT2 to contribute to the light emission of the pixel PXL, and some or a predetermined number of the first light emitting elements LD1 may be electrically connected or coupled in a reverse direction between the first split electrode ELT11 and the second pixel electrode ELT2. Similarly, some or a predetermined number of the second light emitting elements LD2 may be electrically connected or coupled in a forward direction between the second split electrode ELT12 and the second pixel electrode ELT2 to contribute to the light emission of the pixel PXL, and some or a predetermined number of the second light emitting elements LD2 may be electrically connected or coupled in a reverse direction between the second split electrode ELT12 and the second pixel electrode ELT2.

However, the disclosure is not limited thereto. For example, in an embodiment, the first and/or second light source units LSU1 and LSU2 may include only a single light emitting element LD electrically connected or coupled between the first and second pixel electrodes ELT1 and ELT2, or may include a plurality of light emitting elements LD electrically connected or coupled in any one direction (for example, forward direction) between the first and second pixel electrodes ELT1 and ELT2.

Figure 7:
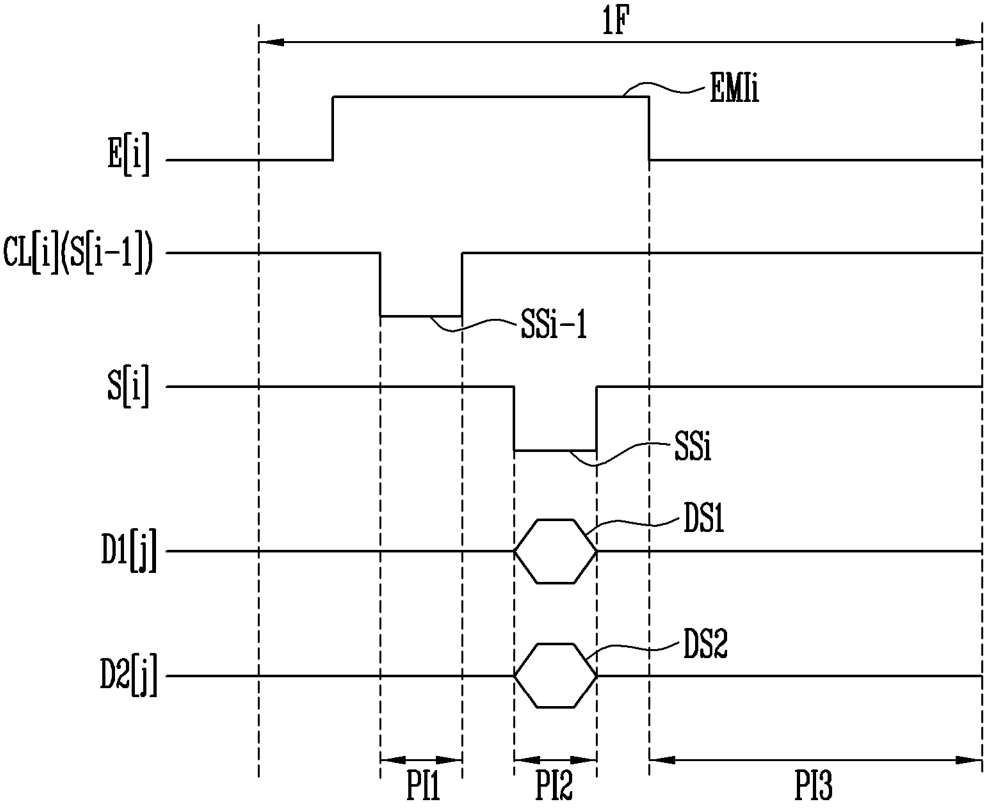
FIG. 7 illustrates an embodiment of a method of driving the pixel shown in FIG. 5.

FIG. 7 illustrates an embodiment of a method of driving the pixel PXL shown in FIG. 5. Hereinafter, the method of driving the pixel PXL shown in FIG. 5 will be described further with reference to FIG. 7 together with FIG. 5.

Referring to FIGS. 5 and 7, during one frame period 1F, the emission control signal EMIT of the gate-off voltage is first supplied to the emission control line E[i]. During a period when the emission control signal EMIT is supplied, the fifth, sixth, and eighth transistors T5, T6, and T8 maintain the turn-off state.

During a period when the emission control signal EMIT of the gate-off voltage is supplied, a previous scan signal SSi−1 and a current scan signal SSi may be sequentially supplied to the initialization control line CL[i], for example, a previous scan line S[i−1] as the initialization control line CL[i] and the current scan line S[i], respectively. The previous scan signal SSi−1 and the current scan signal SSi each may have a gate-on voltage.

During a first period PI1 when the previous scan signal SSi−1 of the gate-on voltage is supplied, the pixel PXL is initialized. For example, if the previous scan signal SSi−1 is supplied, the fourth transistor T4 is turned on, and the voltage of the initialization power supply VINT is transmitted to the first node N1. Thus, the voltage stored in the first capacitor C1 and the gate voltage of the first transistor T1 in the previous frame period may be initialized by the voltage of the initialization power supply VINIT. When the voltage of the initialization power supply VINIT is set to be less than or equal to the lowest voltage of the first data signal, and therefore, the voltage of the initialization power supply VINIT is transmitted to the first node N1, the first transistor T1 is turned on.

During a second period PI2 when the current scan signal SSi of the gate-on voltage is supplied, the first and second data signals DS1 and DS2 may be transmitted to the pixel PXL. For example, if the current scan signal SSi is supplied, the second, third, and ninth transistors T2, T3, and T9 may be turned on.

If the second and third transistors T2 and T3 may be turned on, the first data signal DS1 supplied to the first data line D1[j] is sequentially transmitted through the second, first, and third transistors T2, T1, and T3 to the first node N1. Since the first transistor T1 may be electrically connected in a diode form by the third transistor T3, the voltage (for example, voltage corresponding a voltage difference between the first data signal DS1 and the threshold voltage of the first transistor T1) corresponding to the first data signal DS1 and the threshold voltage of the first transistor T1 may be transmitted to the first node N1. The voltage transmitted to the first node N1 is charged in the first capacitor C1. For example, the voltage corresponding to the voltage difference between the first power supply VDD and the first node N1 may be charged in the first capacitor C1.

When the ninth transistor T9 is turned on, a second data signal DS2 supplied to the second data line D2[j] is transmitted through the ninth transistor T9 to the second node N2. The voltage transmitted to the second node N2 is charged in the second capacitor C2.

After the initialization step and the charging of the first and second data signals DS1 and DS2 may be completed, the supply of the emission control signal EMIT of the gate-off voltage is stopped. During a third period PI3, the voltage of the emission control signal EMIT maintains the gate-on voltage. Thus, while the fifth, sixth, and eighth transistors T5, T6, and T8 may be turned on, the pixel PXL emits light having luminance corresponding to the first data signal DS1 (it does not emit light when the first data signal DS1 corresponding to a black gray scale is supplied).

By way of further example, if the fifth and sixth transistors T5 and T6 may be turned on, a current path from the first power supply VDD via the fifth, first, and sixth transistors T5, T1, and T6 and the first light source unit LSU1 towards the second power supply VSS may be formed. During the third period PI3, the first transistor T1 may generate a driving current corresponding to the voltage of the first node N1. Since the threshold voltage of the first transistor T1 may be stored together with the voltage of the first data signal DS1 during the second period PI2, the threshold voltage of the first transistor T1 may be offset during the third period PI3, so that the driving current corresponding to the voltage of the first data signal DS1 may flow through the pixel PXL regardless of the threshold voltage of the first transistor T1. Thus, an image of uniform quality may be displayed in the pixel unit 100 (FIG. 4).

Meanwhile, if the eighth transistor T8 is turned on, the second node N2 may be electrically connected or coupled to the gate electrode of the seventh transistor T7, so that the voltage of the second data signal DS2 supplied to the second node N2 may be transmitted to the gate electrode of the seventh transistor T7. Therefore, the on-off of the seventh transistor T7 may be determined according to the voltage level of the second data signal DS2.

In an embodiment, the second data signal DS2 may have a predetermined gate-on voltage (hereinafter referred to as a "first voltage"), for example, a low voltage capable of stably turning on the seventh transistor T7, or may have a predetermined gate-off voltage (hereinafter referred to as a "second voltage"), for example, a high voltage capable of stably turning off the seventh transistor T7. When the gate-on voltage is transmitted to the second node N2 during the second period PI2, the seventh transistor T7 is turned on. Meanwhile, when the gate-off voltage is transmitted to the second node N2 during the second period PI2, the seventh transistor T7 is turned off.

If the seventh transistor T7 is turned on by the second data signal DS2 of the first voltage, the first and second light source units LSU1 and LSU2 may be electrically connected or coupled in parallel between the first transistor T1 and the second power supply VSS during the third period PI3. Thus, the driving current from the first transistor T1 is distributed and flows in the first and second light source units LSU1 and LSU2.

If the seventh transistor T7 is turned off by the second data signal DS2 of the second voltage, during the third period PI3, an electrical connection between the first transistor T1 and the second light source unit LSU2 may be interrupted, and only an electrical connection between the first transistor T1 and the first light source unit LSU1 may be maintained by the sixth transistor T6. Thus, the driving current from the first transistor T1 may be supplied to only the first light source unit LSU1.

Assuming that the pixel PXL expresses the same gray scale, in a case that comparing a case where only the first light source unit LSU1 may be selectively driven with a case where both the first and second light source units LSU1 and LSU2 may be driven, the amount of current flowing in each first light emitting element LD1 (for example, the first light emitting element LD1 electrically connected or coupled in the forward direction) may be increased in the former case. Therefore, the low gray-scale expressiveness of the pixel PXL may be enhanced.

According to the above-described embodiment, at least some or a predetermined number of the first and second light source units LSU1 and LSU2 may be selectively driven for each pixel PXL in each frame period 1F, by supplying the second data signal DS2 of the first voltage (gate-on voltage) or the second voltage (gate-off voltage) to each pixel PXL in each frame period 1F through the second data line D2[j]. For instance, by supplying the second data signal DS2 of the second voltage to the pixel PXL during a period when each pixel PXL expresses the low gray scale equal to or less than a predetermined gray scale, the seventh transistor T7 may be controlled in the turn-off state during the emission period of the corresponding frame period 1F. In this case, the driving current generated from the driving-current generator 101 is supplied to only the first light source unit LSU1. Therefore, in a case that comparing a case where the gray scale is expressed by both the first and second light sources units LSU1 and LSU2 with a case where the same gray scale is expressed by only the first light source unit LSU1, the amount of current flowing in the first light source unit LSU1 may be increased in the latter case. Thus, while the amount of current flowing in each first light emitting element LD1 (for example, the first light emitting element LD1 electrically connected or coupled in the forward direction between the first and second power supplies VDD and VSS to be activated) provided in the first light source unit LSU1 may be increased, the first light emitting element LD1 may emit light having a desired luminance. According to an embodiment, the gray scale may be more precisely expressed even in the low gray-scale region.

Meanwhile, during each frame period 1F when each pixel PXL expresses a high gray scale that may be higher than a predetermined gray scale, the second data signal DS2 of the first voltage (gate-on voltage) may be supplied through the second data line D2[j] to the pixel PXL, thus driving both the first and second light source units LSU1 and LSU2. Thus, by efficiently utilizing the light emitting elements LD disposed in each pixel PXL, the pixel PXL may emit light having a desired luminance.

Figure 8:
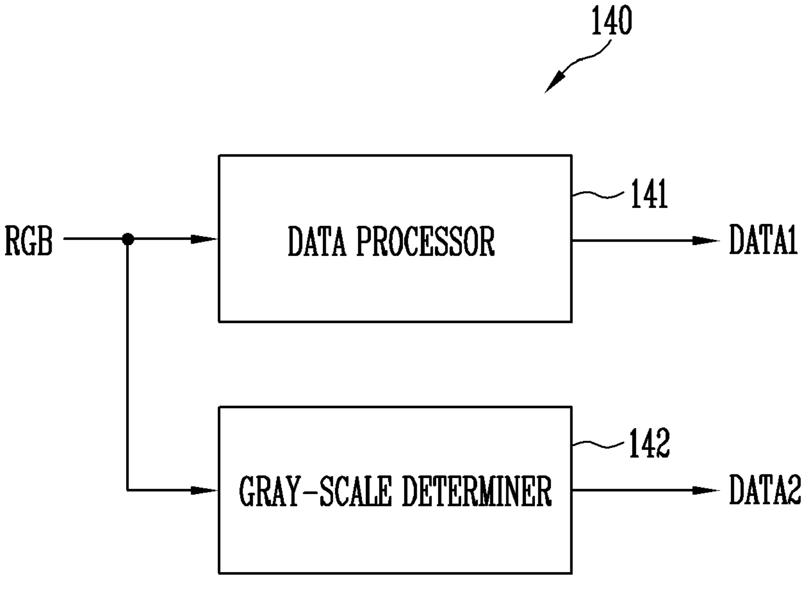
FIG. 8 illustrates a timing controller in accordance with an embodiment.

FIG. 8 illustrates a timing controller 140 in accordance with an embodiment. For instance, FIG. 8 is a block diagram illustrating embodiment of the timing controller 140 that may be provided or disposed in the display device of FIG. 4.

Referring to FIGS. 4 to 8, the timing controller 140 in accordance with an embodiment may output first data DATA1 corresponding to the image data RGB, and second data DATA2 corresponding to a gray-scale level of the image data RGB. To achieve the above-mentioned purpose, the timing controller 140 may include a data processor 141 and a gray-scale determiner 142.

The data processor 141 may process the image data RGB to generate the first data DATA1. For instance, the data processor 141 may generate the first data DATA1 by rearranging the image data RGB according to the specification of each display panel.

The gray-scale determiner 142 may compare a gray-scale value of each pixel PXL included in the image data RGB with a predetermined reference gray-scale value, and then generate the second data DATA2 corresponding to the compared result. For example, the gray-scale determiner 142 may output the second data DATA2 having a predetermined first gray-scale value (for example, a white gray-scale value) corresponding to the first voltage (gate-on voltage), when the gray-scale value of each pixel PXL is larger than a reference gray-scale value (or, when the gray-scale value of each pixel PXL is equal to or more than a reference gray-scale value). Meanwhile, the gray-scale determiner 142 may output the second data DATA2 having a predetermined second gray-scale value (for example, a black gray-scale value) corresponding to the second voltage (gate-off voltage), when the gray-scale value of each pixel PXL is equal to or less than a reference gray-scale value (or, when the gray-scale value of each pixel PXL is smaller than a reference gray-scale value).

In an embodiment, the reference gray-scale value may be variously set according to characteristics of the display panel. For instance, when the gray value expressed by the display device ranges from 0 gray scale (for example, black gray scale) to 255 gray scale (for example, white gray scale), the reference gray-scale value may be 32 gray scale falling within a low gray-scale range. However, the disclosure is not limited thereto, and the reference gray-scale value may be variously changed.

In an embodiment, the timing controller 140 may alternately output the first and second data DATA1 and DATA2. For example, the timing controller 140 may sequentially output the first and second data DATA1 and DATA2 on the second pixel, after sequentially outputting the first and second data DATA1 and DATA2 on the first pixel, in the case of outputting the first and second data DATA1 and DATA2 corresponding to each frame. In this way, the timing controller 140 may output the first and second data DATA1 and DATA2 of the pixels PXL corresponding to each frame.

In an embodiment, the timing controller 140 may simultaneously output the first and second data DATA1 and DATA2. For example, the timing controller 140 may simultaneously output the first and second data DATA1 and DATA2 on the second pixel, after simultaneously outputting the first and second data DATA1 and DATA2 on the first pixel, in the case of outputting the first and second data DATA1 and DATA2 corresponding to each frame. In this way, the timing controller 140 may output the first and second data DATA1 and DATA2 of the pixels PXL corresponding to each frame.

The first and second data DATA1 and DATA2 outputted from the timing controller 140 may be supplied to the data driver 130. Then, the data driver 130 generates the first and second data signals DS1 and DS2 using the first and second data DATA1 and DATA2, respectively.

Figure 9:
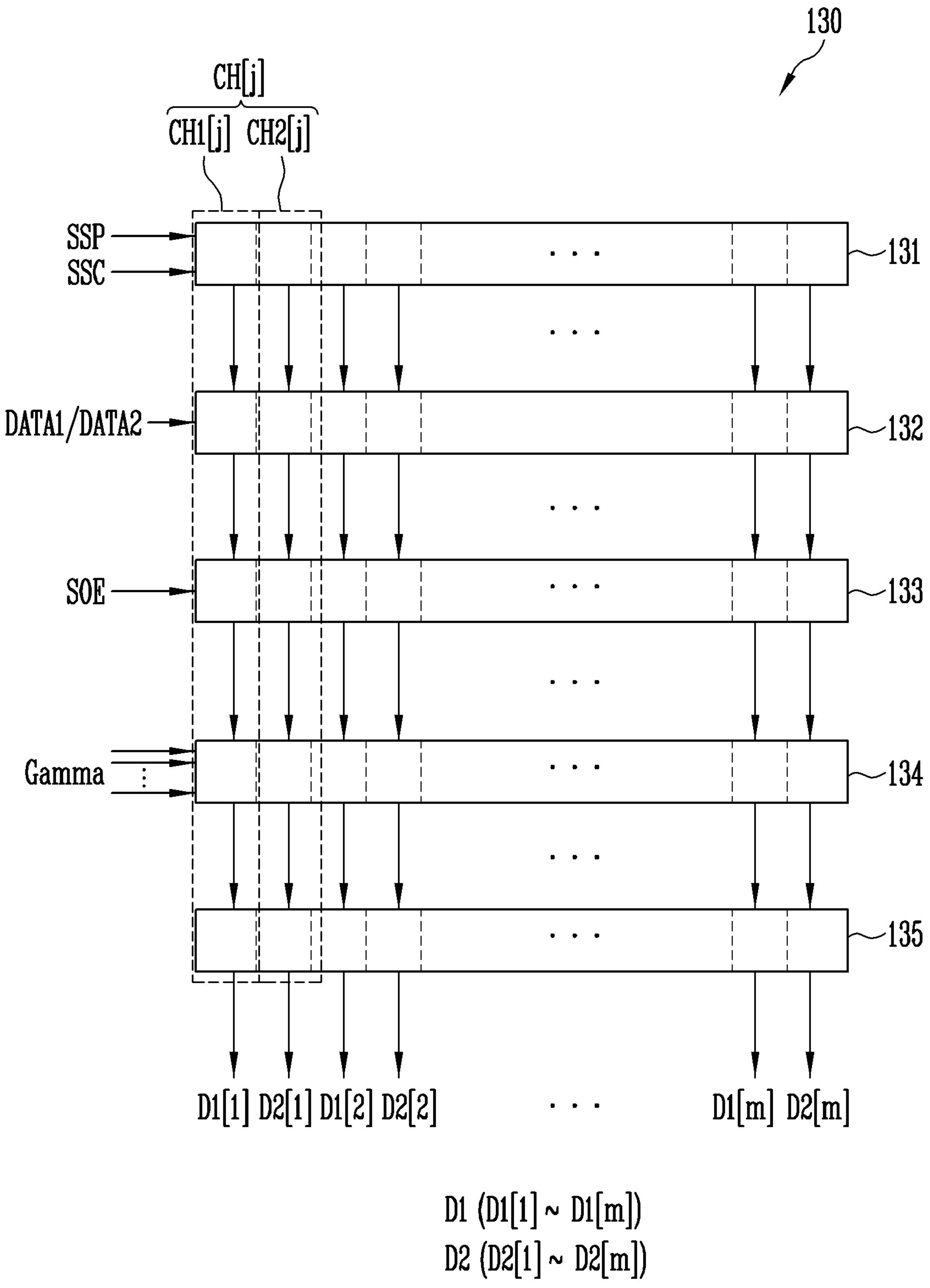
FIG. 9 illustrates a data driver in accordance with an embodiment.

FIG. 9 illustrates a data driver 130 in accordance with an embodiment. For instance, FIG. 9 is a block diagram illustrating an embodiment of the data driver 130 that may be provided or disposed in the display device of FIG. 4.

Referring to FIGS. 4 to 9, the data driver 130 in accordance with an embodiment may alternately receive the first and second data DATA1 and DATA2 of each pixel PXL from the timing controller 140. The data driver 130 may generate the first and second data signals DS1 and DS2 corresponding to the first and second data DATA1 and DATA2, respectively.

In an embodiment, the data driver 130 may include a shift register unit 131, a sampling latch unit 132, a holding latch unit 133, a data signal generator 134, and a buffer unit 135. Here, the shift register unit 131, the sampling latch unit 132, and the holding latch unit 133 may constitute an input circuit of the data driver 130, and the buffer unit 135 may constitute an output circuit of the data driver 130.

The shift register unit 131 may receive a source start pulse SSP and a source sampling clock SSC from the timing controller 140. The shift register unit 131 may sequentially generate sampling pulses while shifting the source start pulse SSP per cycle of the source sampling clock SSC. To this end, the shift register unit 131 may be provided with a plurality of shift registers. For instance, the shift register unit 131 may be provided with shift registers corresponding to the number of the first and second data lines D1 and D2, for example, 2m shift registers.

The sampling latch unit 132 may sequentially store the first and second data DATA1 and DATA2 supplied from the timing controller 140 to correspond to sampling pulses that may be sequentially supplied from the shift register unit 131. To this end, the sampling latch unit 132 may be provided with a plurality of sampling latches. For instance, the sampling latch unit 132 may be provided with sampling latches corresponding to the number of the first and second data lines D1 and D2, for example, 2m sampling latches. In an embodiment, the first data DATA1 corresponding to the first pixel may be stored in the sampling latch of a first channel, and the second data DATA2 corresponding to the first pixel may be stored in the sampling latch of a second channel. Furthermore, the first data DATA1 corresponding to the second pixel may be stored in the sampling latch of a third channel, and the second data DATA2 corresponding to the second pixel may be stored in the sampling latch of a fourth channel. In this manner, the first or second data DATA1 or DATA2 corresponding to any one pixel PXL may be stored in each sampling latch.

The holding latch unit 133 may receive a source output enable signal SOE from the timing controller 140. Such a holding latch unit 133 may receive the first and second data DATA1 and DATA2 from the sampling latch unit 132 to store the first and second data DATA1 and DATA2, when the source output enable signal SOE is input. For instance, the holding latch unit 133 may simultaneously receive the first and second data DATA1 and DATA2 from the sampling latch unit 132, in response to the source output enable signal SOE. Furthermore, the holding latch unit 133 may supply the first and second data DATA1 and DATA2 stored therein to the data signal generator 134, when the source output enable signal SOE is input. To this end, the holding latch unit 133 may be provided with a plurality of holding latches. For instance, the holding latch unit 133 may be provided with holding latches corresponding to the number of the first and second data lines D1 and D2, for example, 2m holding latches.

Although it is shown in FIG. 9 that the input circuit of the data driver 130 is composed of the shift register unit 131, the sampling latch unit 132, and the holding latch unit 133, the disclosure is not limited thereto. For instance, the input circuit may further include various components.

The data signal generator 134 may generate the first and second data signals DS1 and DS2, respectively, using the first and second data DATA1 and DATA2 supplied from the input circuit. To this end, the data signal generator 134 may include a plurality of digital-to-analog converters arranged or disposed in each channel. Each digital-to-analog converter (hereinafter, referred to as "DAC") may select any one of gamma voltages Gamma in response to the first or second data DATA1 or DATA2 supplied to the converter, and may supply the selected gamma voltage Gamma as the first or second data signal DS1 or DS2 to each channel of the buffer unit 135. For instance, the first DAC located or disposed in the first channel of the data signal generator 134 may generate the first data signal DS1 corresponding to the first data DATA1 of the first pixel, and may supply the first data signal DS1 to the first buffer disposed in the first channel of the buffer unit 135. Furthermore, the second DAC located or disposed in the second channel of the data signal generator 134 may generate the second data signal DS2 corresponding to the second data DATA2 of the first pixel, and may supply the second data signal DS2 to the second buffer disposed in the second channel of the buffer unit 135. Similarly, the third DAC located or disposed in the third channel of the data signal generator 134 may generate the first data signal DS1 corresponding to the first data DATA1 of the second pixel, and may supply the first data signal DS1 to the third buffer disposed in the third channel of the buffer unit 135. Furthermore, the fourth DAC located or disposed in the fourth channel of the data signal generator 134 may generate the second data signal DS2 corresponding to the second data DATA2 of the second pixel, and may supply the second data signal DS2 to the fourth buffer disposed in the fourth channel of the buffer unit 135. In this way, the data signal generator 134 may generate the first and second data signals DS1 and DS2 corresponding to the first and second data DATA1 and DATA2 of each pixel PXL, and may output the first and second data signals DS1 and DS2 to each channel of the buffer unit 135.

The buffer unit 135 may include a plurality of buffers disposed in each channel of the data driver 130. Such a buffer unit 135 supplies the first and second data signals DS1 and DS2 supplied from the data signal generator 134 to the first and second data lines D1 and D2, respectively. For instance, the buffer unit 135 may supply the first data signal DS1 of the first pixel supplied from the first channel of the data signal generator 134 to the first data line D1[1] on the first place, and may supply the second data signal DS2 of the first pixel supplied from the second channel of the data signal generator 134 to the second data line D2[1] on the first place. In this way, the buffer unit 135 may supply the first and second data signals DS1 and DS2 supplied from the data signal generator 134 to the first and second data lines D1 and D2, respectively.

The data driver 130 in accordance with the above-described embodiment may be provided with data channels having a number corresponding to the number of the first and second data lines D1 and D2. For example, the data driver 130 may include odd data channels (hereinafter, referred to as "first data channels") corresponding to each first data line D1, and even data channels (hereinafter, referred to as "second data channels") corresponding to each second data line D2. For instance, the data driver 130 may include m j-th data channel pairs CH[j] including a first data channel CH1[j] on a j-th place and a second data channel CH2[j] on the j-th place, which may be electrically connected or coupled to the pixels PXL disposed on a j-th (j is a natural number of 1 or more and m or less) vertical line.

The data driver 130 may generate the first and second data signals DS1 and DS2 corresponding to the first and second data DATA1 and DATA2 of each pixel PXL. The first and second data signals DS1 and DS2 generated from the data driver 130 may be supplied through respective first and second data lines D1 and D2 to respective pixels PXL.

Figure 10:
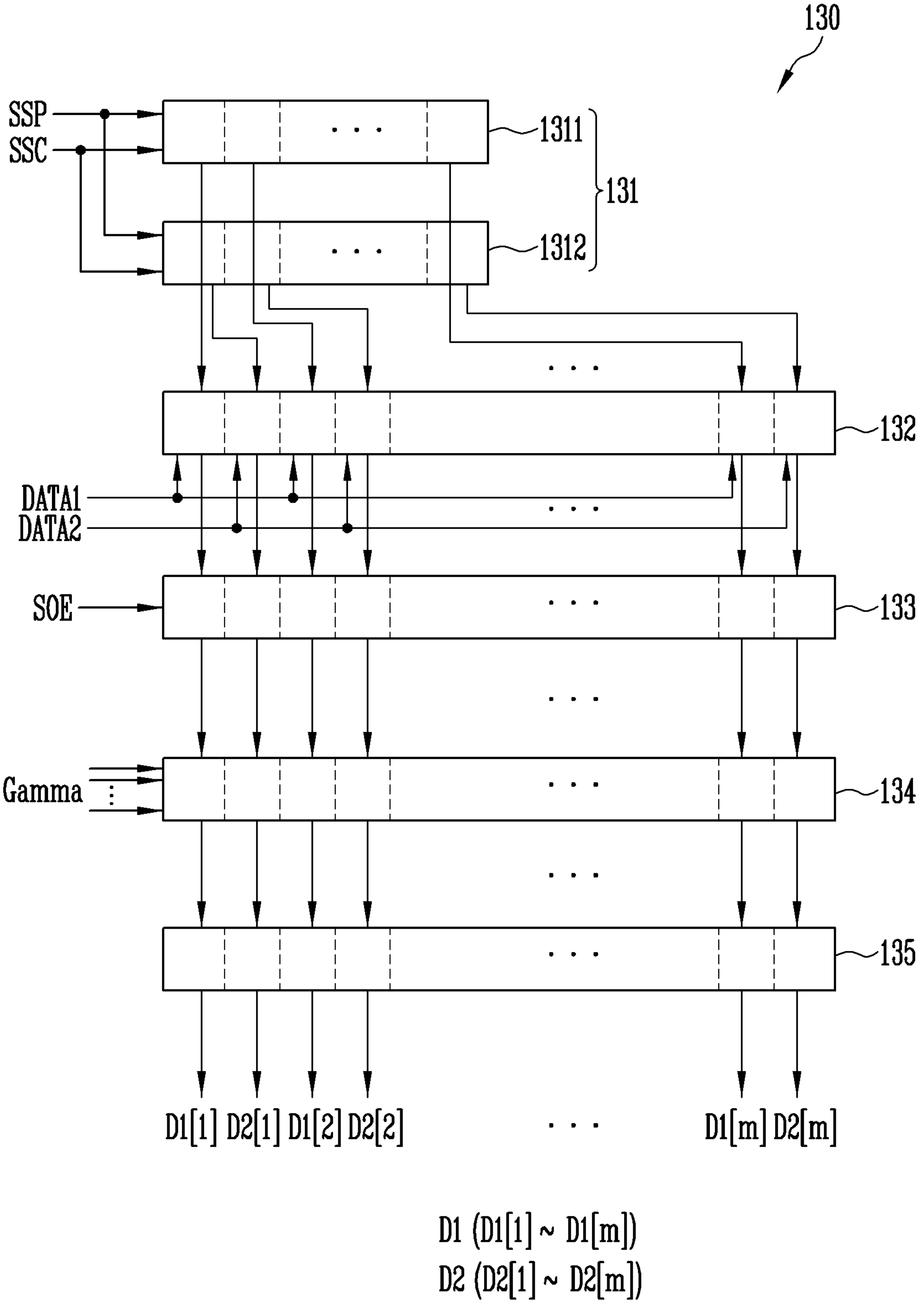
FIG. 10 illustrates a data driver in accordance with an embodiment.

FIG. 10 illustrates a data driver 130 in accordance with an embodiment. For instance, FIG. is a block diagram illustrating a modification of the data driver 130 in accordance with an embodiment of FIG. 9. In FIG. 10, the same reference numerals are used to designate components similar or identical to those of an embodiment of FIG. 9, and further explanation thereof will be omitted.

Referring to FIG. 10, the data driver 130 in accordance with an embodiment may simultaneously receive the first and second data DATA1 and DATA2 from the timing controller 140, and may generate the first and second data signals DS1 and DS2 corresponding to the first and second data DATA1 and DATA2. To this end, the shift register unit 131 may include a first shift register part 1311 and a second shift register part 1312 that may be simultaneously driven by the source start pulse SSP and the source sampling clock SSC.

The first shift register part 1311 may sequentially generate a sampling pulse in response to the source start pulse SSP and the source sampling clock SSC, and may supply the sampling pulse to some or a predetermined number of channels of the sampling latch unit 132. For instance, the first shift register part 1311 may sequentially supply the sampling pulse from the timing controller 140 to shift registers of odd channels into which the first data DATA1 is input.

The second shift register part 1312 may sequentially generate a sampling pulse in response to the source start pulse SSP and the source sampling clock SSC, and may supply the sampling pulse to other channels of the sampling latch unit 132. For instance, the second shift register part 1312 may sequentially supply the sampling pulse from the timing controller 140 to shift registers of even channels into which the second data DATA2 is input.

Thus, the first data DATA1 of the corresponding pixel PXL may be sequentially input into the sampling latches disposed in the odd channels of the sampling latch unit 132, and the second data DATA2 of the corresponding pixel PXL may be sequentially input into the sampling latches disposed in the even channels of the sampling latch unit 132.

The remaining operation of the data driver 130 may be substantially equal or similar to that of the above-described embodiment. Therefore, detailed descriptions pertaining to this will be omitted.

The pixel PXL according to the above-described embodiments and the display device having the pixel selectively drive at least some or a predetermined number of the light emitting elements LD, which drive each pixel PXL to emit light having luminance corresponding to the image data RGB and constitute the light source unit LSU of the pixel PXL in response to a gray-scale level which is to be expressed in the pixel PXL. To this end, the first pixel electrode ELT1 of each pixel PXL is divided into the first and second split electrodes ELT11 and ELT12 to be electrically connected or coupled to different switching elements, for example, the sixth and seventh transistors T6 and T7.

In an embodiment, when the gray-scale value of the image data RGB corresponding to each pixel PXL falls within a low gray-scale range (or low gray-scale region) equal to or less than a predetermined reference gray-scale value, the seventh transistor T7 is controlled in the off state during the emission period (for example, a third period PI3 of FIG. 7) of the corresponding frame period 1F, thus supplying a driving current to only the first light source unit LSU1, and preventing the driving current from being supplied to the second light source unit LSU2. According to an embodiment, a gray scale may be more precisely expressed even in a low gray-scale region.

By way of further example, if both the first and second light source units LSU1 and LSU2 may be driven to express a corresponding gray scale, the driving current may be distributed to the first and second light source units LSU1 and LSU2, so that the intensity of current flowing in each light emitting element LD may be reduced. It may be difficult to control the brightness of each light emitting element LD with a low current, compared to controlling the brightness of each light emitting element LD with a higher current. Hence, when the gray scale is expressed by driving both the first and second light source units LSU1 and LSU2 in the low gray-scale range where the gray scale is equal to or less than a predetermined reference gray-scale value, it may be difficult to precisely express the gray scale.

In contrast, if only some or a predetermined number of light emitting elements LD, for example, the first light emitting elements LD1 provided or disposed in the first light source unit LSU1 may be selectively driven in the low gray-scale range where the gray scale is equal to or less than a predetermined reference gray-scale value as in an embodiment, the driving current may not be supplied to the second light source unit LSU2 but my be supplied to only the first light source unit LSU1, so that current flowing in each first light emitting element LD1 may be increased. Thus, it may be possible to improve the low gray-scale expressiveness of each pixel PXL and the display device including the same.

A method of driving the display device in accordance with an embodiment will be described in brief. The method of driving the display device may include a step of generating the first and second data DATA1 and DATA2 in response to the image data RGB, a step of generating the first and second data signals DS1 and DS2 in response to the first and second data DATA1 and DATA2 and supplying the first and second data signals DS1 and DS2 to each pixel PXL, and a step of generating a driving current in each pixel PXL in response to the first data signal DS1 and driving the light source unit LSU of the corresponding pixel PXL by the driving current. Furthermore, in an embodiment, at least some or a predetermined number of light emitting elements LD (for example, the first light emitting elements LD1 or the first and second light emitting elements LD1 and LD2) among the plurality of light emitting elements LD (for example, the first and second light emitting elements LD1 and LD2)

constituting the light source unit LSU of each pixel PXL may be selectively driven in response to the second data signal DS2.

In an embodiment, the step of generating the second data DATA2 may be a step of comparing the gray-scale value of each pixel PXL included in the image data RGB with a predetermined reference gray-scale value, and generating the second data DATA2 corresponding to a compared result. For example, the step of generating the second data DATA2 may include a step of outputting the second data DATA2 having a predetermined first gray-scale value corresponding to a first voltage (gate-on voltage) when the gray-scale value of the image data RGB corresponding to each pixel PXL is larger than a reference gray-scale value, and outputting the second data DATA2 having a predetermined second gray-scale value corresponding to a second voltage (gate-off voltage) when the gray-scale value of the image data RGB corresponding to the pixel PXL is equal to or less than the reference gray-scale value. In this case, when the gray-scale value of the image data RGB corresponding to the pixel PXL may be equal to or less than the reference gray-scale value, electrical connection between some or a predetermined number of light emitting elements LD (for example, second light emitting elements LD2 among the effective light emitting elements LD) among the effective light emitting elements LD (for example, the first and second light emitting elements LD1 and LD2 electrically connected or coupled in the forward direction) provided or disposed in the pixel PXL and the first transistor T1 (drive transistor) of the pixel PXL may be interrupted, so that only other light emitting elements LD among the effective light emitting elements LD (for example, first light emitting elements LD1 among the effective light emitting elements LD) may be selectively driven. Thus, it may be possible to improve the low gray-scale expressiveness of the pixel PXL and the display device including the same. According to an embodiment, the image quality of the display device may be improved.

While the scope of the disclosure are described by detailed embodiments, it should be noted that the above-described embodiments are merely descriptive and should not be considered limiting. It should be understood by those skilled in the art that various changes, substitutions, and alterations may be made herein without departing from the scope of the disclosure as defined by the claims.

The scope of the disclosure is not limited by detailed descriptions of the specification, and may be defined by the accompanying claims. Furthermore, all changes or modifications of the disclosure derived from the meanings and scope of the claims, and equivalents thereof should be construed as being included in the scope of the disclosure.

What is claimed is:

1. A pixel comprising:

a first light source unit including at least one first light emitting element electrically coupled between a first electrode and a second power supply electrode;

a second light source unit including at least one second light emitting element electrically coupled between a second electrode and the second power supply electrode in a number different from a number of the at least one first light emitting element;

a driving-current generator including a first transistor electrically coupled between a first power supply electrode and the first light source unit and between the first power supply electrode and the second light source unit, the driving-current generator generating a driving current corresponding to a first data signal applied to a first data line;

a first switching unit including a first switching element electrically coupled between the driving-current generator and the first light source unit; and a second switching unit including a second switching element electrically coupled between the driving-current generator and the second light source unit to connect the first transistor and the second light source unit in response to a second data signal applied to a second data line.

2. The pixel according to claim 1, wherein:

a first electrode of the first transistor is electrically coupled to the first power supply electrode, a second electrode of the first transistor is electrically coupled to the first switching element and the second switching element, and a gate electrode of the first transistor is electrically coupled to a first node.

3. The pixel according to claim 2, wherein the driving-current generator further comprises at least one of:

a second transistor electrically coupled between the first data line and the first electrode of the first transistor, and including a gate electrode electrically coupled to a scan line;

a third transistor electrically coupled between the second electrode of the first transistor and the first node, and including a gate electrode electrically coupled to the scan line;

a fourth transistor electrically coupled between the first node and an initialization power supply electrode, and including a gate electrode electrically coupled to an initialization control line;

a fifth transistor electrically coupled between the first power supply electrode and the first electrode of the first transistor, and including a gate electrode electrically coupled to an emission control line; and a first capacitor electrically coupled between the first power supply electrode and the first node.

4. The pixel according to claim 1, wherein the first switching unit comprises a sixth transistor being the first switching element, and the sixth transistor is electrically coupled between the first transistor and the first electrode, and comprises a gate electrode electrically coupled to an emission control line.

5. The pixel according to claim 1, wherein the second switching unit comprises:

a seventh transistor electrically coupled between the first transistor and the second electrode, the seventh transistor being the second switching element;

an eighth transistor electrically coupled between a gate electrode of the seventh transistor and a second node, and comprising a gate electrode electrically coupled to an emission control line;

a ninth transistor electrically coupled between the second data line and the second node, and comprising a gate electrode electrically coupled to a scan line; and a second capacitor electrically coupled between the first power supply electrode and the second node.

6. The pixel according to claim 1, wherein the first light source unit comprises:

a pixel electrode spaced apart from the first electrode; and a plurality of first light emitting elements including the at least one first light emitting element, and electrically coupled in parallel between the first electrode and the pixel electrode.

7. The pixel according to claim 1, wherein the second light source unit comprises:

a pixel electrode spaced apart from the second electrode; and a plurality of second light emitting elements including the at least one second light emitting element, and electrically coupled in parallel between the second electrode and the pixel electrode.

8. The pixel according to claim 1, wherein the first electrode and the second electrode are spaced apart from each other and disposed in an emission region, and the first light source unit and the second light source unit further comprise a pixel electrode electrically coupled between an end of each of the at least one first light emitting element and the at least one second light emitting element and the second power supply electrode.

9. A display device, comprising:

a timing controller that outputs first data corresponding to image data, and second data corresponding to a gray-scale level of the image data;

a data driver that generates first data signals and second data signals corresponding to the first data and the second data, respectively, and that outputs the first data signals and the second data signals to a first data line and a second data line, respectively; and at least one pixel electrically coupled to the first data line and the second data line, wherein the at least one pixel comprises:

a first light source unit including at least one first light emitting element electrically coupled between a first electrode and a second power supply electrode;

a second light source unit including at least one second light emitting element electrically coupled between a second electrode and the second power supply electrode in a number different from a number of the at least one first light emitting element;

a driving-current generator including a first transistor electrically coupled between a first power supply electrode and the first light source unit and between the first power supply electrode and the second light source unit, the driving-current generator generating a driving current corresponding to the first data signal;

a first switching unit including a first switching element electrically coupled between the driving-current generator and the first light source unit; and a second switching unit including a second switching element electrically coupled between the driving-current generator and the second light source unit to connect the first transistor and the second light source unit in response to the second data signal.

10. The display device according to claim 9, wherein the timing controller comprises:

a gray-scale determiner that compares a gray-scale value corresponding to the at least one pixel among gray-scale values included in the image data with a reference gray-scale value, and generates the second data corresponding to a compared result of the gray-scale value corresponding to the pixel and the reference gray-scale value.

11. The display device according to claim 10, wherein the gray-scale determiner outputs the second data having a first gray-scale value corresponding to a gate-on voltage when the gray-scale value corresponding to the at least one pixel is larger than the reference gray-scale value, and outputs the second data having a second gray-scale value corresponding to a gate-off voltage when the gray-scale value corresponding to the at least one pixel is equal to or less than the reference gray-scale value.

12. The display device according to claim 9, further comprising a pixel unit including:

a plurality of pixels disposed on horizontal lines and vertical lines;

scan lines electrically coupled to pixels of at least each horizontal line; and first data lines and second data lines electrically coupled to pixels of each vertical line, wherein the data driver comprises data channels electrically coupled to different data lines among the first data lines and second data lines.

13. The display device according to claim 9, wherein:

a first electrode of the first transistor is electrically coupled to the first power supply electrode, a second electrode of the first transistor is electrically coupled to the first switching element and the second switching element, and a gate electrode of the first transistor is electrically coupled to a first node.

14. The display device according to claim 13, wherein the driving-current generator further comprises at least one of:

a second transistor electrically coupled between the first data line and the first electrode of the first transistor, and including a gate electrode electrically coupled to a scan line of a corresponding horizontal line;

a third transistor electrically coupled between the second electrode of the first transistor and the first node, and including a gate electrode electrically coupled to the scan line;

a fourth transistor electrically coupled between the first node and an initialization power supply electrode, and including a gate electrode electrically coupled to an initialization control line of the corresponding horizontal line;

a fifth transistor electrically coupled between the first power supply electrode and the first electrode of the first transistor, and including a gate electrode electrically coupled to an emission control line of the corresponding horizontal line; and a first capacitor electrically coupled between the first power supply electrode and the first node.

15. The display device according to claim 9, wherein the first switching unit comprises a sixth transistor being the first switching element, and the sixth transistor is electrically coupled between the first transistor and the first electrode, and comprises a gate electrode electrically coupled to an emission control line of a corresponding horizontal line.

16. The display device according to claim 9, wherein the second switching unit comprises:

a seventh transistor electrically coupled between the first transistor and the second electrode, the seventh transistor being the second switching element;

an eighth transistor electrically coupled between a gate electrode of the seventh transistor and a second node, and comprising a gate electrode electrically coupled to an emission control line of a corresponding horizontal line;

a ninth transistor electrically coupled between the second data line and the second node, and including a gate electrode electrically coupled to a scan line of the corresponding horizontal line; and a second capacitor electrically coupled between the first power supply electrode and the second node.

17. The display device according to claim 9, wherein the first electrode and the second electrode are spaced apart from each other and disposed in an emission region of the at least one pixel, and the first light source unit and the second light source unit further comprise a pixel electrode electrically coupled between an end of each of the at least one first light emitting element and the at least one second light emitting element and the second power supply electrode.

* * * * *